(12) United States Patent
Wang

(10) Patent No.: US 7,197,898 B2
(45) Date of Patent: Apr. 3, 2007

(54) ROBUST DIAMETER-CONTROLLED OPTICAL FIBER DURING OPTICAL FIBER DRAWING PROCESS

(76) Inventor: Sheng-Guo Wang, 2516 Radrick La., Charlotte, NC (US) 28262

( * ) Notice: Subject to any disclaimer, the term of this patent is extended or adjusted under 35 U.S.C. 154(b) by 213 days.

(21) Appl. No.: 09/989,799

(22) Filed: Nov. 20, 2001

(65) Prior Publication Data

US 2002/0066292 A1    Jun. 6, 2002

Related U.S. Application Data

(60) Provisional application No. 60/250,962, filed on Dec. 4, 2000.

(51) Int. Cl.
*C03B 37/00* (2006.01)
(52) U.S. Cl. .......................... 65/382; 65/377
(58) Field of Classification Search ................. 65/382, 65/377, 484, 491
See application file for complete search history.

(56) References Cited

U.S. PATENT DOCUMENTS

| | | | | |
|---|---|---|---|---|
| 4,793,840 A | * | 12/1988 | Harding | 65/381 |
| 5,073,179 A | * | 12/1991 | Yoshimura et al. | 65/382 |
| 5,551,967 A | * | 9/1996 | Urruti | 65/378 |
| 6,178,778 B1 | * | 1/2001 | Kenmochi et al. | 65/381 |
| 6,220,057 B1 | * | 4/2001 | Yamamura et al. | 65/382 |
| 6,371,394 B1 | * | 4/2002 | Roba | 242/178 |
| 6,438,997 B1 | * | 8/2002 | Saito et al. | 65/382 |
| 6,516,636 B1 | * | 2/2003 | Gansicke et al. | 65/379 |

FOREIGN PATENT DOCUMENTS

| | | | |
|---|---|---|---|
| GB | 2238536 | * | 11/1989 |
| JP | 52-120841 | * | 10/1977 |
| JP | 06-206734 | * | 7/1994 |

* cited by examiner

*Primary Examiner*—Dionne W. Mayes

(57) ABSTRACT

There is provided robust diameter-controlled optical fiber during optical fiber drawing process and an optical fiber drawing process which comprises drawing the optical fiber from a perform therefor under tension to form the optical fiber while heating and melting the preform, wherein an outer diameter of the preform is measured (at a safe position immediately) above the furnace, an outer diameter of the optical fiber on which no coating has been provided is measured at one process position or two process positions before coating, and drawing conditions are robustly controlled based on the deviation of the measured optical fiber diameter data and the measured preform diameter data from a preselected outer diameter of the optical fiber and a preselected outer diameter of the preform.

7 Claims, 11 Drawing Sheets

A schematic of robust diameter-controlled optical fiber drawing process

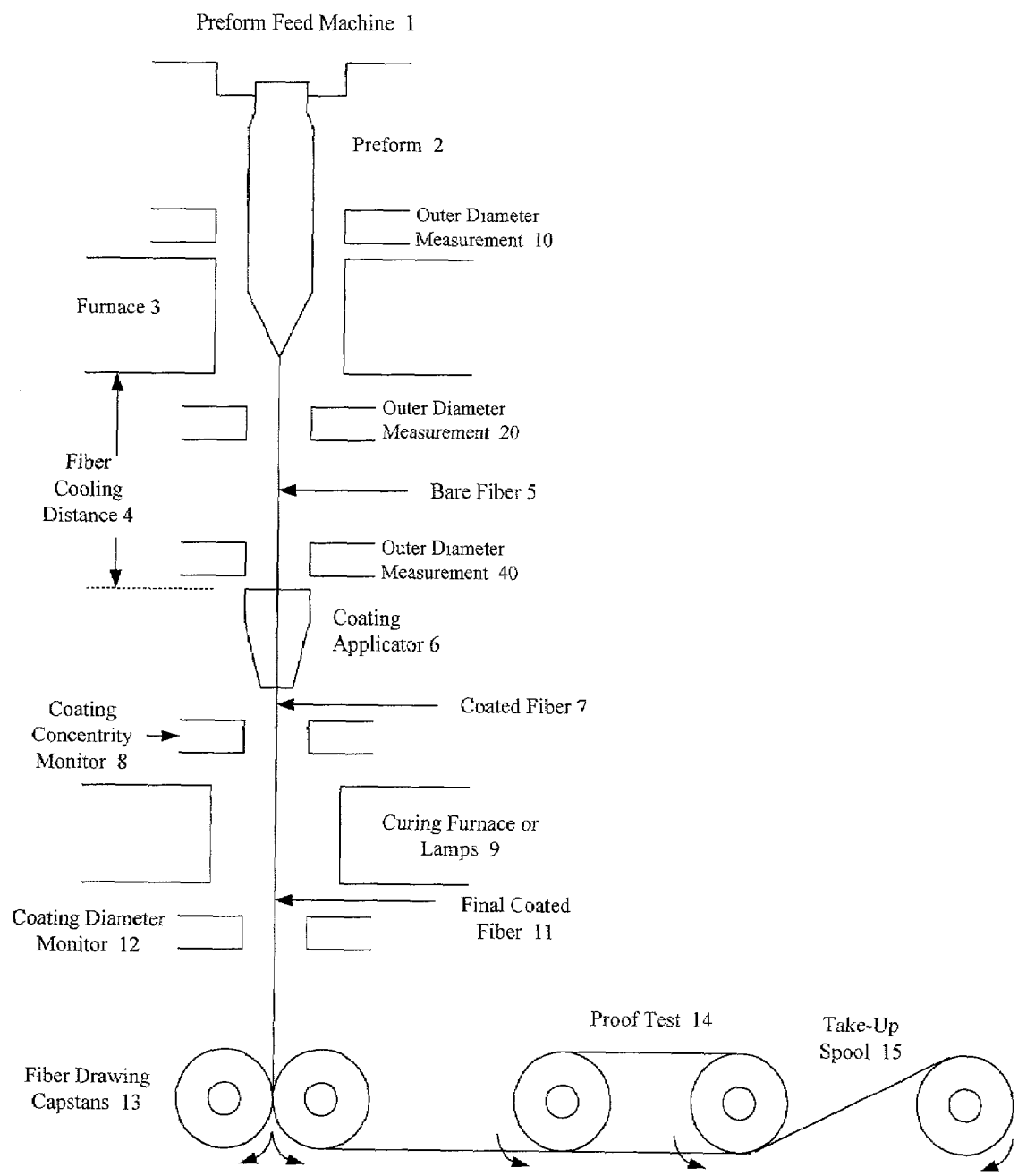
Figure 1. A schematic of robust diameter-controlled optical fiber drawing process

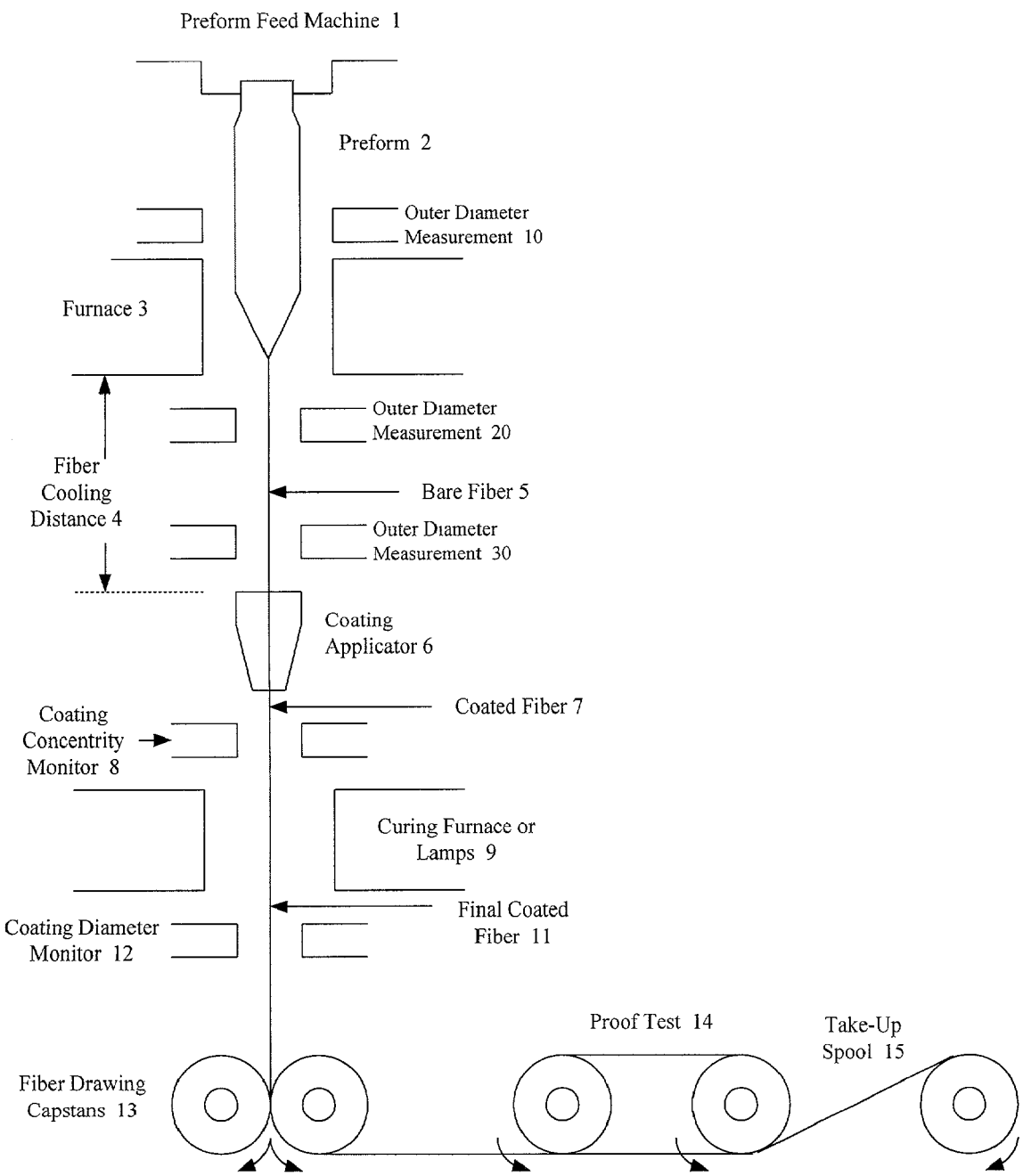
Figure 2. Another schematic of robust diameter-controlled optical fiber drawing process

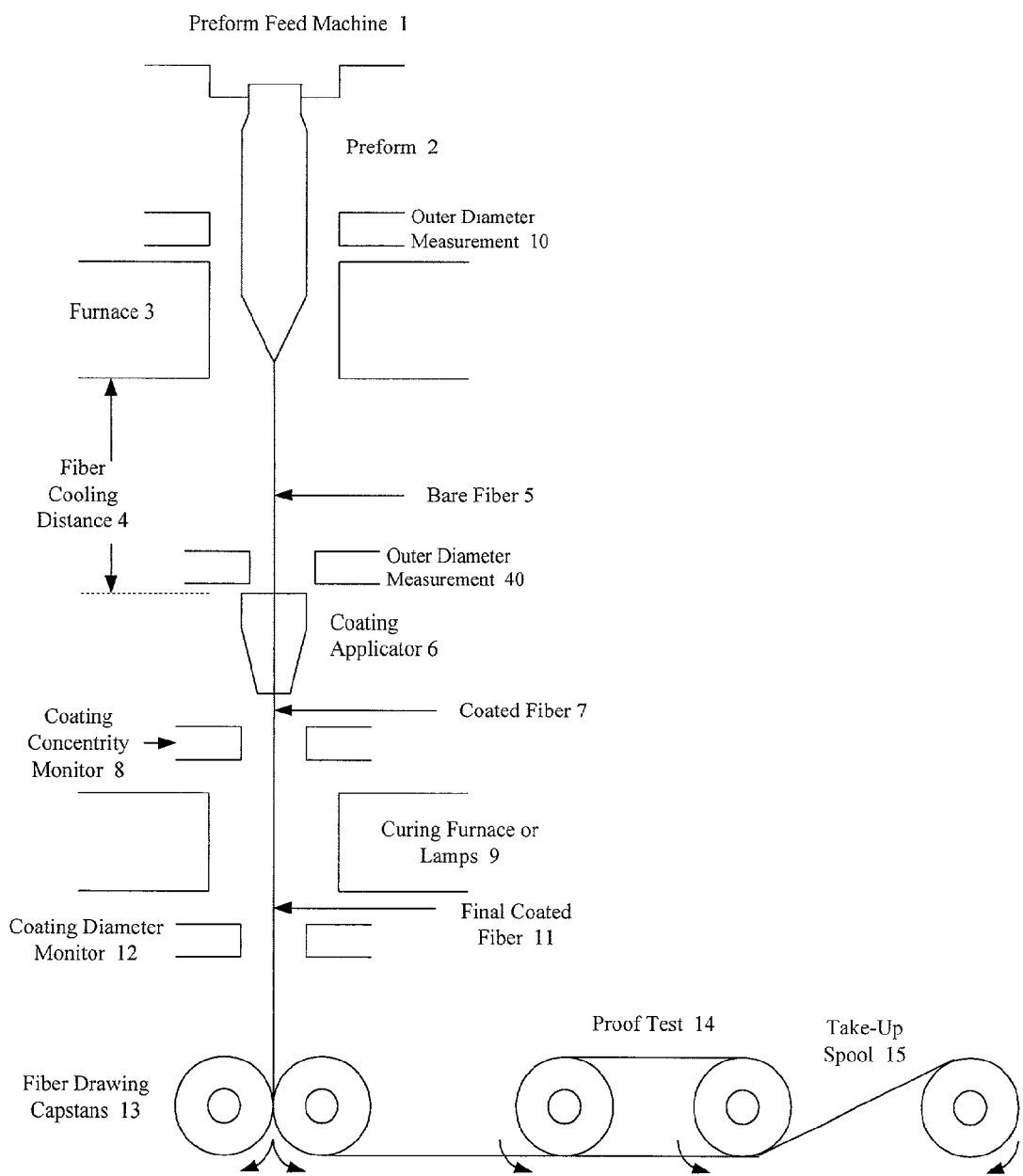
Figure 3. A schematic of robust diameter-controlled optical fiber drawing process with one bare fiber diameter monitor

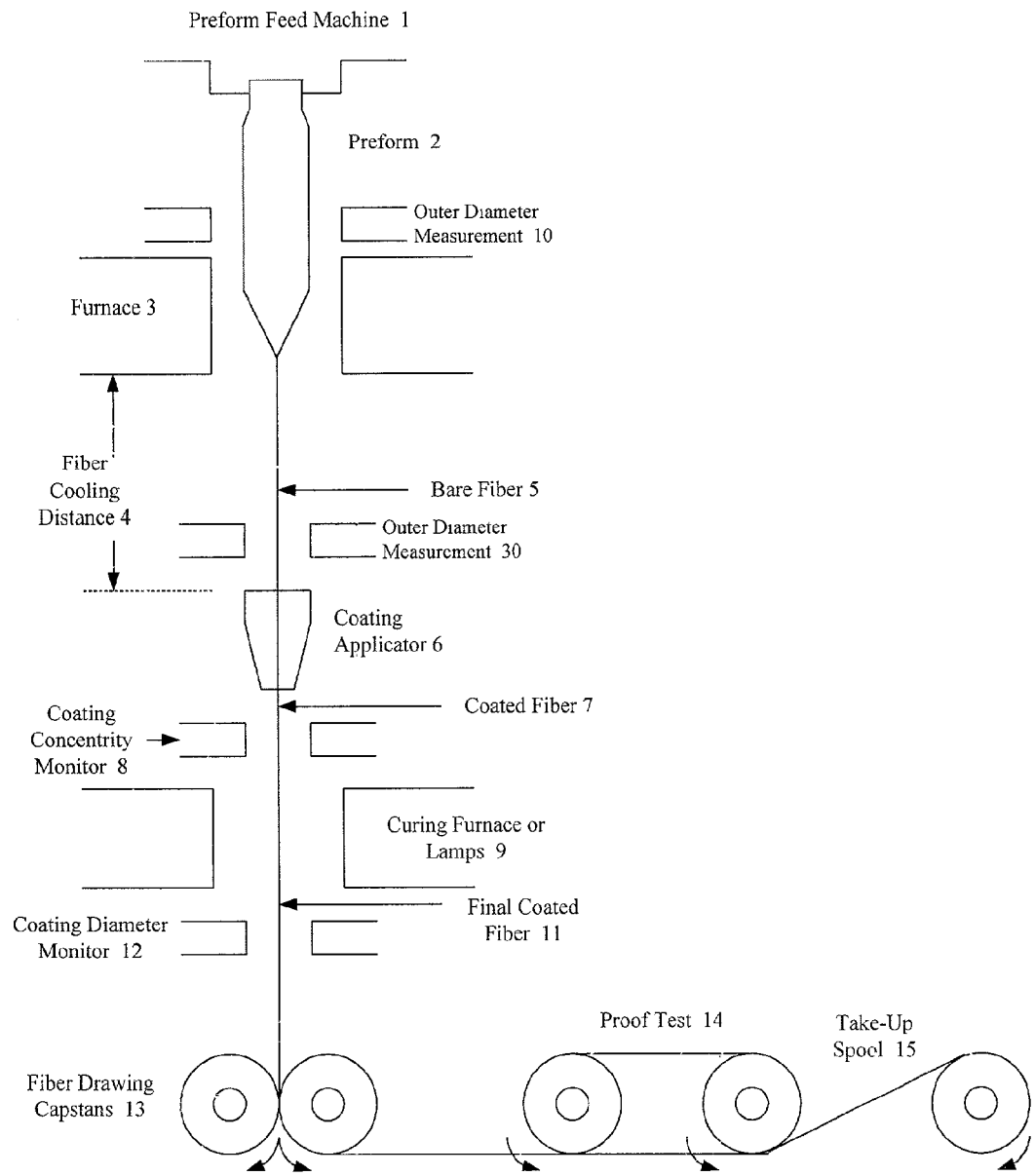
Figure 4. Another schematic of robust diameter-controlled optical fiber drawing process with one bare fiber diameter monitor considering shrinkage

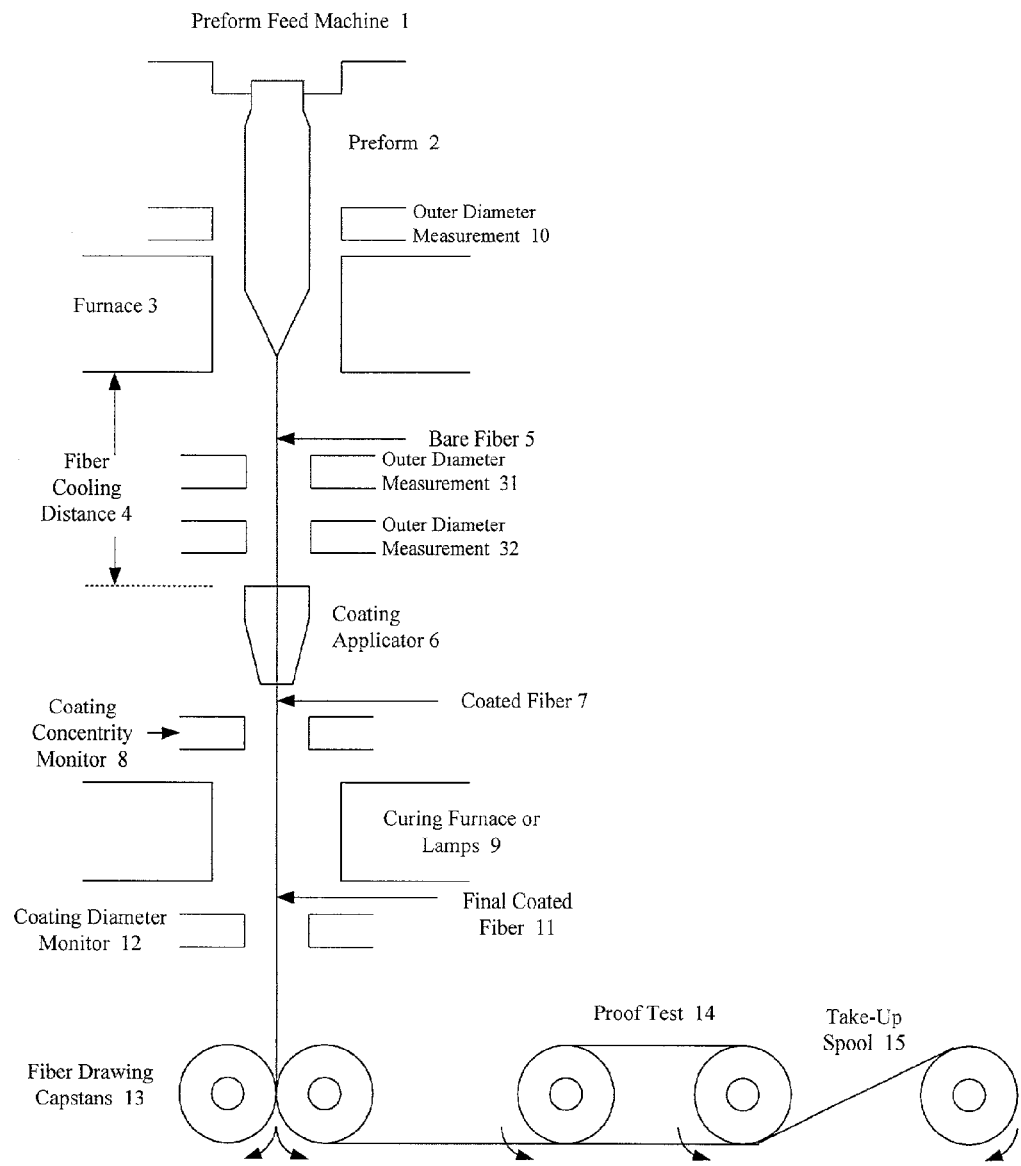
Figure 5. Another schematic of robust diameter-controlled optical fiber drawing process with one bare fiber diameter monitor considering shrinkage at an adjustable position

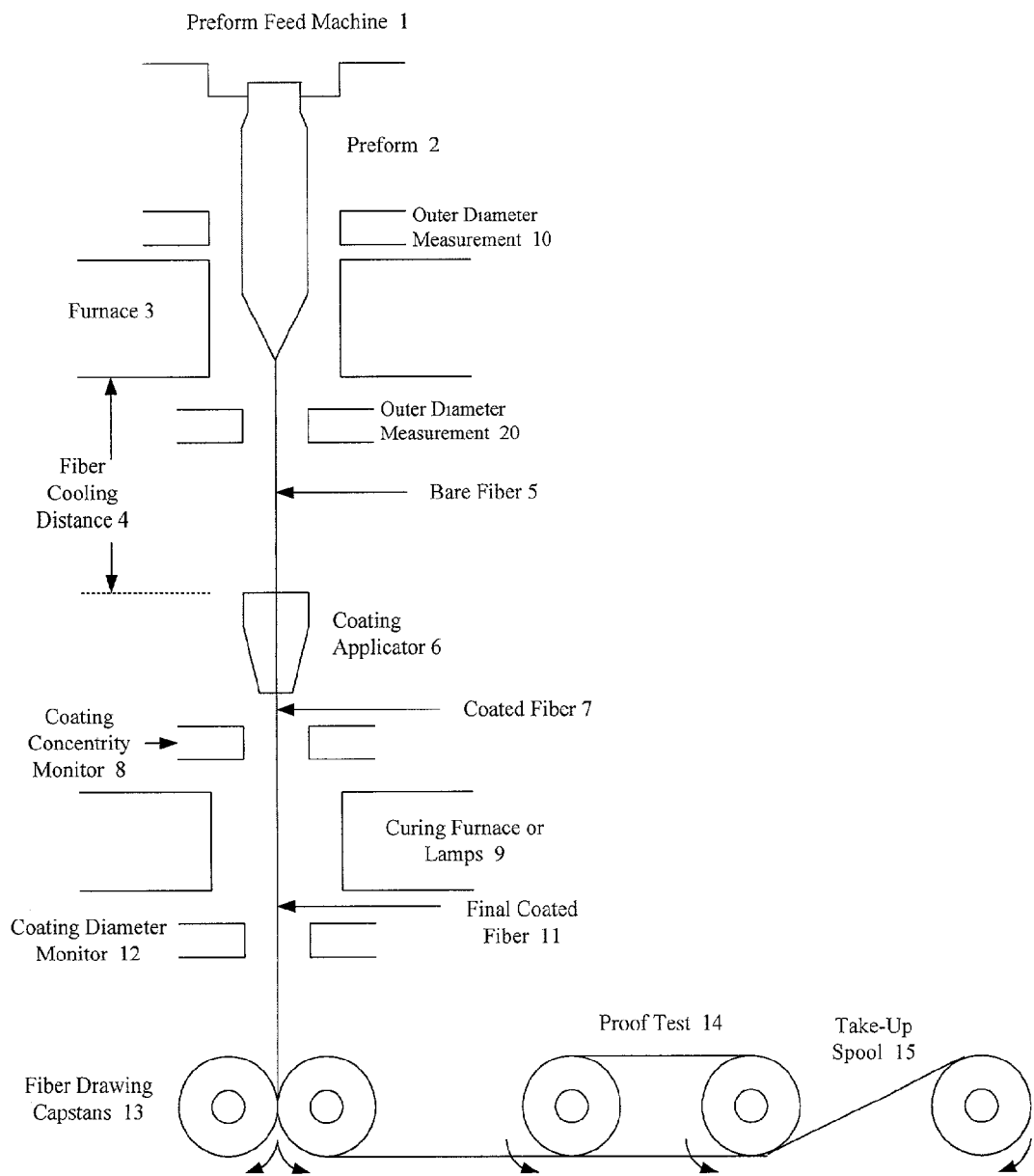
Figure 6. A schematic of robust diameter-controlled optical fiber drawing process with only one bare fiber diameter monitor near the furnace

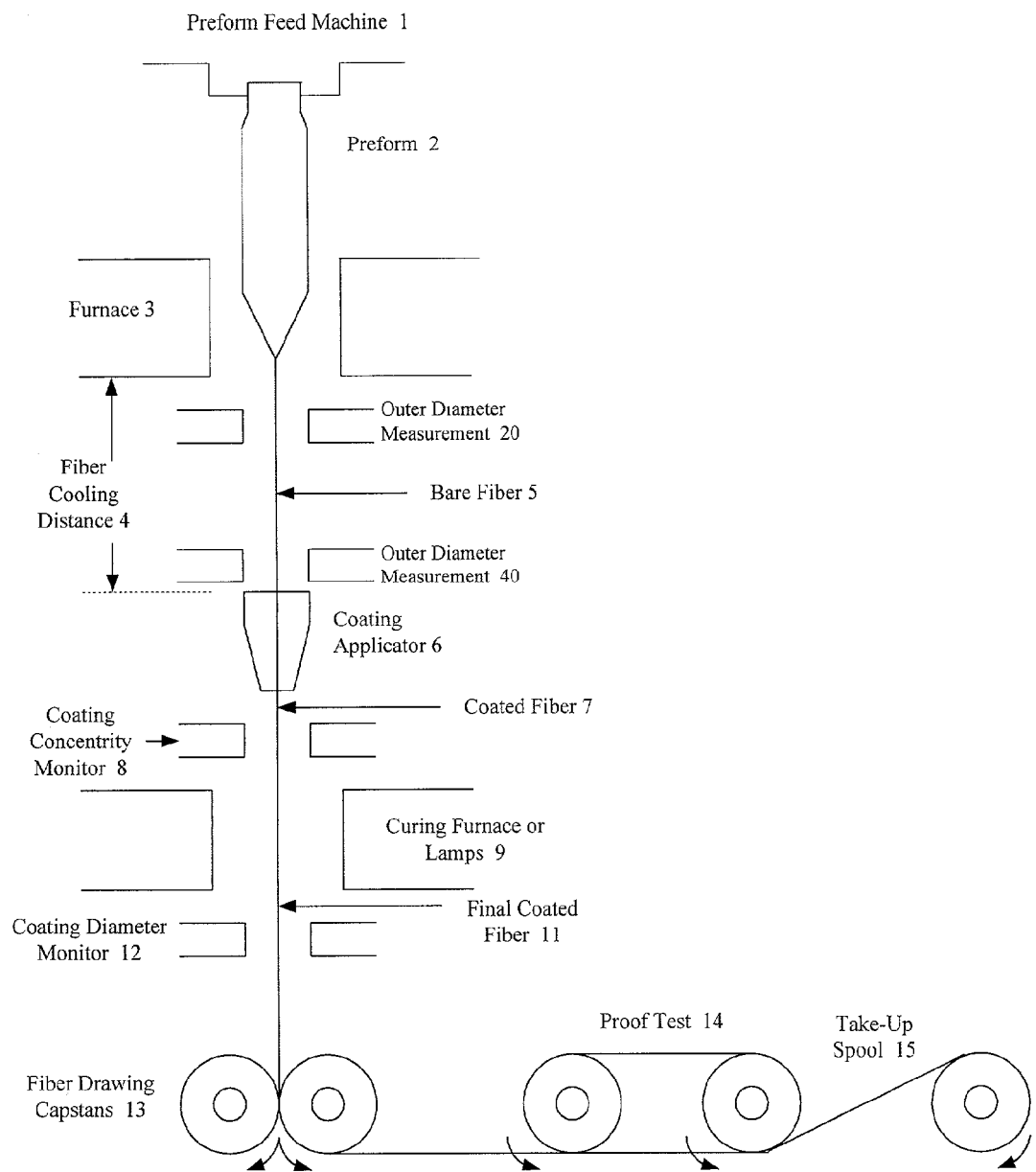
Figure 7. A schematic of robust diameter-controlled optical fiber drawing process with two bare fiber diameter monitors

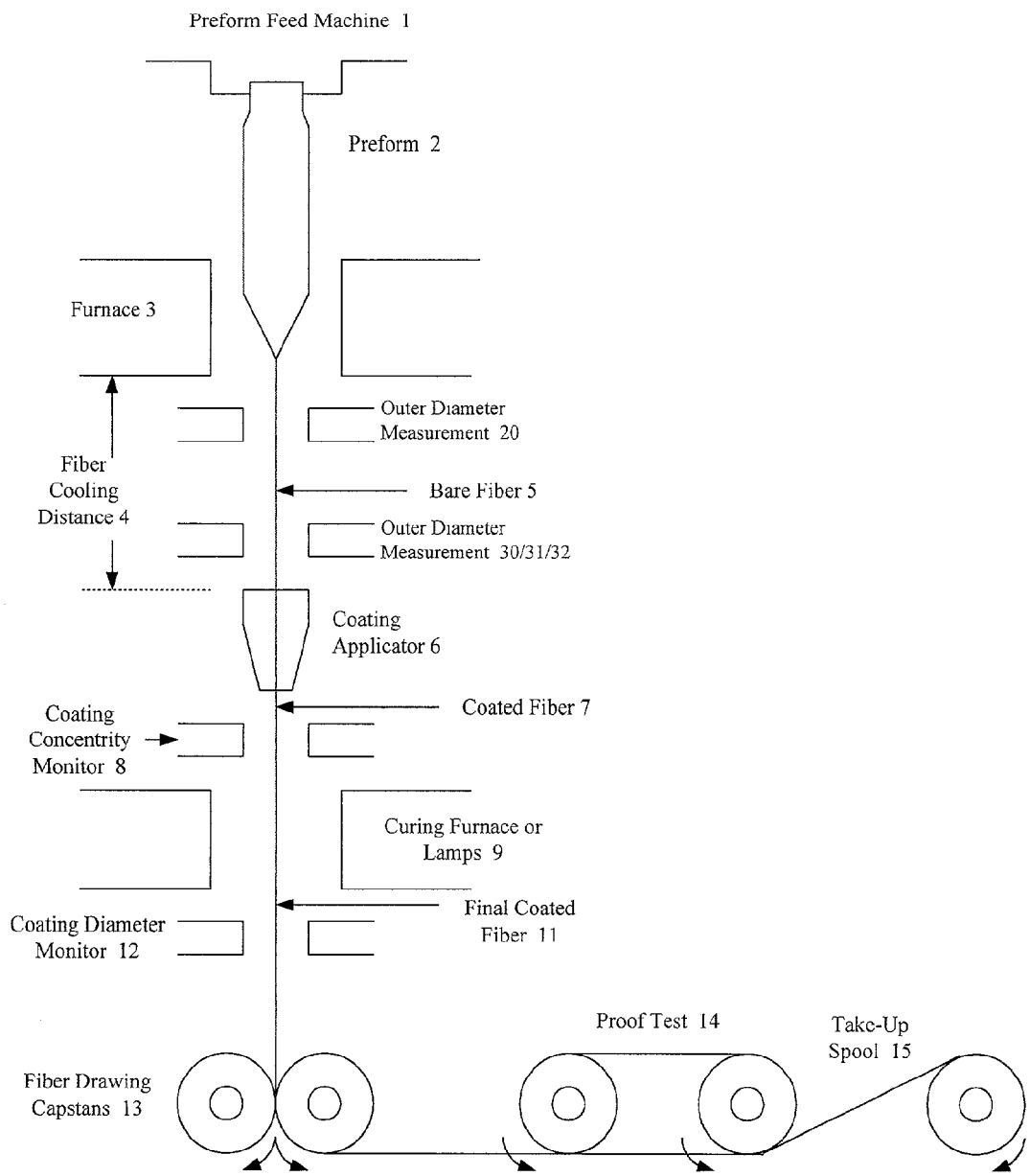
Figure 8. Another schematic of robust diameter-controlled optical fiber drawing process with two bare fiber diameter monitors

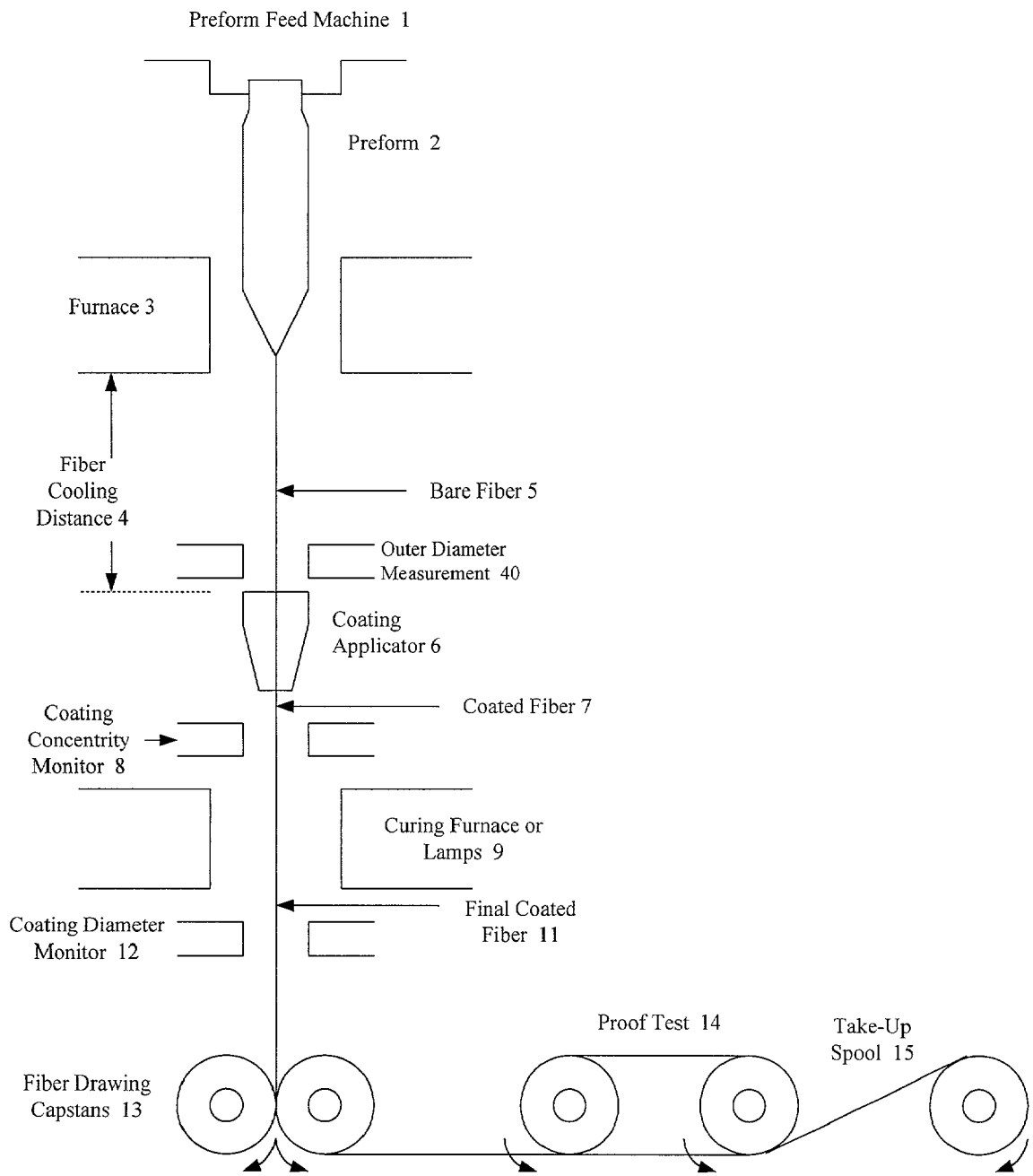
Figure 9. A schematic of diameter-measured optical fiber drawing process

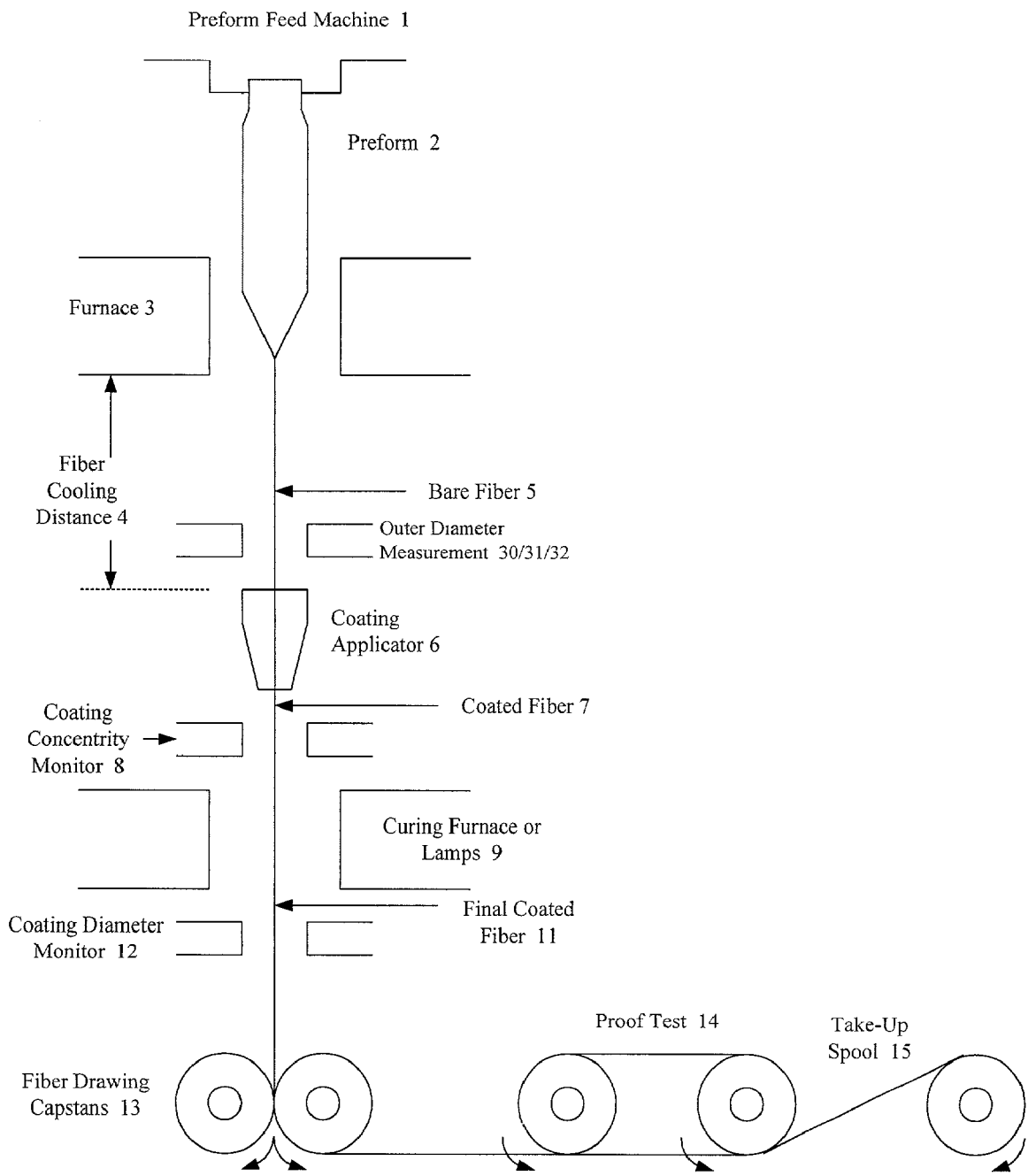
Figure 10. A schematic of optical fiber drawing process (Pre Art 1)

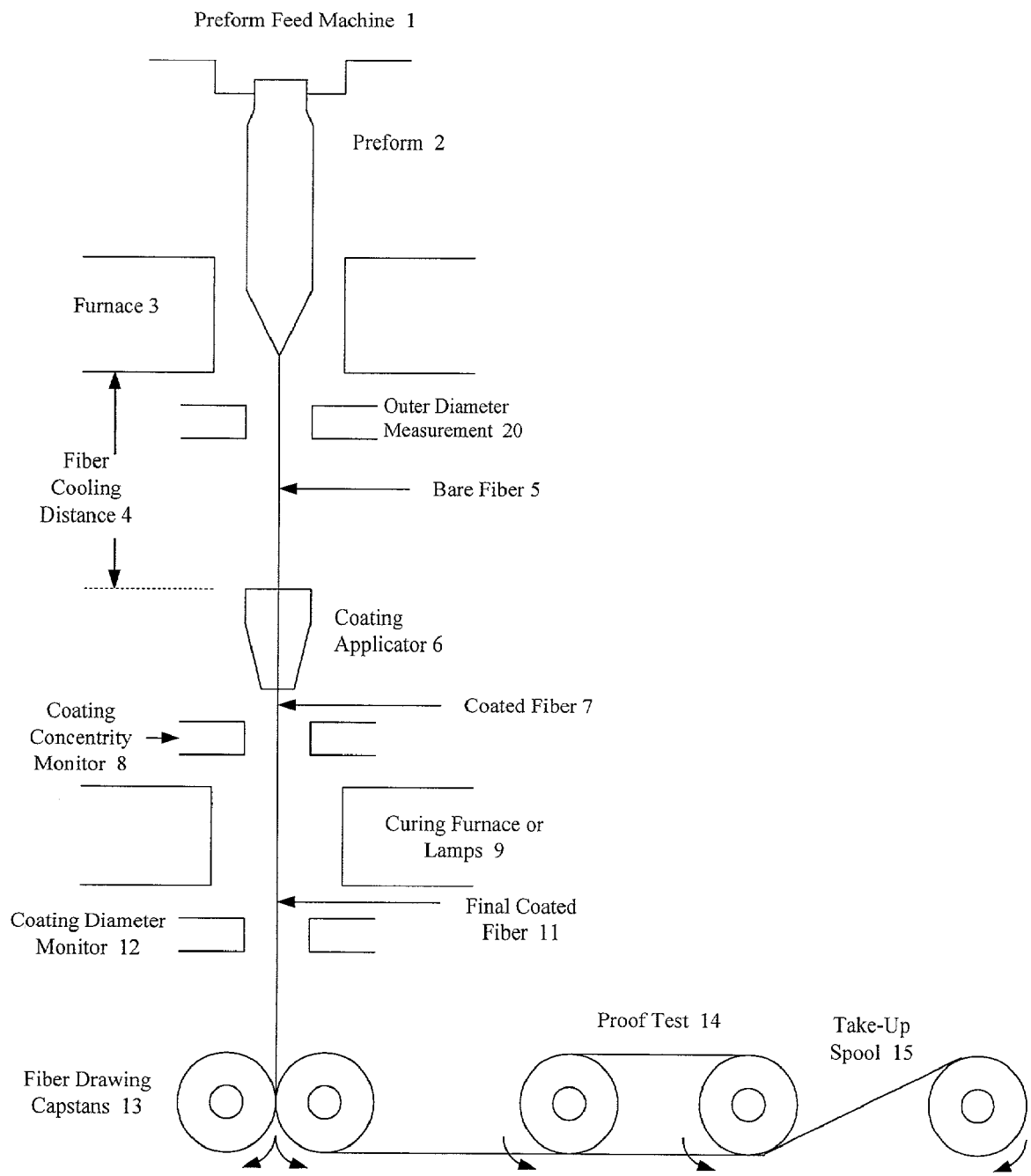
Figure 11. Another schematic of optical fiber drawing process (Pre Art 2)

ROBUST DIAMETER-CONTROLLED OPTICAL FIBER DURING OPTICAL FIBER DRAWING PROCESS

This application is related to the provision Patent Application No. 60/250,962 with a filing date of Dec. 4, 2000.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

Next stage after coating and curing is to pull fiber on to a take-up spool. The fiber passes drawing capstans and wounded on to a take-up spool. There is a proof test, which may be an on-line test before the fiber is placed on the spool or an off-line test after the fiber is placed on the spool. The test may include a strength and tension test. In this fiber take-up stage, winding tension is kept low and the drum's surface is wrapped with a soft foam to cushion the fiber from the drum's surface in order to minimize the effect of added microbending losses. Refer to FIG. 11 to show this conventional drawing process (James J. Refi, *Fiber optic Cable—A Light Guide*).

It is known to employ a control method in which variations in the external diameter of the optical fiber are fed back to a pulling capstan. FIG. 11 (Prior Art) is a schematic diagram of a conventional drawing apparatus utilizing such a control method. An optical fiber preform 2 is melted in a heating furnace 3, pulled by a capstan 13, and formed into an optical fiber 5. The external diameter of the optical fiber 5 is measured by an external diameter measuring instrument 20 which is located just downstream of the heating furnace 3. Thereafter, the optical fiber 5 is coated with a resin by a coating unit 6, and then pulled through a resin curing furnace 9.

The external diameter measurements from the external diameter measuring instrument 20 are fed back to the control system of the pulling rate of the pulling capstan 13 so that the optical fiber has a consistent, predetermined external diameter (normally 125 μm).

A diameter of the bare fiber is measured by a measuring device 20 before the coating steps 6 and 9, whereby conditions during the drawing are controlled so that the outer diameter of the fiber 5 is to be a preselected one.

A position at which the diameter measuring device is disposed has not been thought to be critical, and the device is usually located immediately below the drawing furnace as shown in Japanese Patent Kokai Publication No. 295260/1986.

The main reason to locate the measuring device close to the furnace is to reduce the time lag and to increase a control gain when fluctuation in the diameter of the optical fiber has to be suppressed by controlling a drawing rate depending on an output signal from this measuring device.

If there is anything to limit the position of the measuring device, it has been that the measuring device should not be directly subjected to a strong radiation light from a lower portion of the furnace 3 to avoid being heated to a remarkably high temperature, i.e., located at a safe place.

Thus, as mentioned in U.S. Pat. No. 5,073,179/1991, in the conventional production of the optical fiber, usually a distance between the outer diameter measuring device 20 and the coating die 6 is longer than that between the drawing furnace 3 and the measuring device 20, or a forced cooling device is disposed between the measuring device 20 and the coating die 6 in order to achieve a better resin coating.

It has been noticed that the drawing rate of the optical fiber in drawing process is remarkably increased from a conventional drawing rate with the order of 100 m/min and it is reported that, in an experimental scale, a rate of 1000 m/min has been realized. When such a high drawing rate is employed in the conventional process in which the measuring device is located immediately below the furnace, it has been found that the outer diameter of the finished optical fiber is extremely smaller than the diameter which is measured with the measuring device 20. In order to meet an accuracy requirement in optical fiber diameter, U.S. Pat. No. 5,073,179/1991 proposes a modified fiber drawing process (see FIG. 10 Pre Art) wherein an outer diameter of the optical fiber 5 on which no coating has been provided is measured at position 30 at which shrinkage of the outer diameter of the optical fiber, while stretched, is not larger than 0.5% preferably 0.5 to 0.3% and drawing conditions are controlled with a deviation of a measured diameter at position 30 from a preselected outer diameter.

As used herein, the term "shrinkage" is intended to mean a ratio of difference in diameters between the optical fiber at the measuring position and the optical fiber once it has finished shrinking.

For example, the accuracy of the diameter of a quartz base optical fiber is usually required to be in 125 μm±1 μm. Taking account into an accuracy of the measuring device itself and the fluctuation in the diameter of the optical fiber during the production, a deviation of the measured diameter with the measuring device from a true diameter of the finished fiber should be not larger than 0.5% of the outer diameter of the finished fiber. Thus, a desirable process has been developed with a goal to reach the deviation of 0.5% or less in U.S. Pat. No. 5,073,179/1991.

The position at which the measuring device 30 is disposed is determined on the basis of the estimation of the fiber temperature according to the following equation (1) and experiments:

$$T(Z) = T(O) + (T(S) - T(O))e^{-aZ/V(F)} \quad (1)$$

where T(O) is a room temperature (°C.), T(S) is a temperature (°C.) of an optical fiber immediately after leaving a furnace, Z (m) is a distance from an outlet of the furnace to a position at which an outer diameter of the optical fiber is measured, V(F) is a drawing rate (or linear velocity) (m/min) and "a" is a constant determined with the diameter, a specific heat of the optical fiber and a thermal conductivity between the optical fiber and an atmosphere.

For the experiments, first, the difference between the measured outer diameter at position 30 in FIG. 10 and the true one is obtained with varying the position of the measuring device. Then, a relation between the difference and the measuring position 30 is established. Finally, the position 30 is determined at which the difference is less than 0.5%. Thus, the measuring device can be located at that position 30 and an optical fiber having a better accuracy is produced. It provides a better results comparing with early conventional method. However, it may not robustly maintain a high accuracy due to many disturbance factors, perturbations, and environment changes, as well as drawing speed level changes mentioned in the following paragraph.

It also takes time to detect the outer diameter of the fiber which is under increase in its diameter in the case of small drawing rate, whereby a time lag arises in the control. When the drawing rate is small, detection of the outer diameter is carried out with the measuring device at one location 31 nearer to the furnace and when the rate is increased, the detection is carried out with the measuring device at another location 32 below the former location. Alternatively, only one measuring device is used which can move along the optical fiber depending on the drawing rate. It was described in U.S. Pat. No. 5,073,179/1991.

Further, a forced cooling device for the optical fiber is provided between the furnace and the outer diameter measuring device, whereby the distance between them can be shortened. In this case, the diameter of the optical fiber is also measured at a position 30 at which the shrinkage of the outer diameter is not larger than 0.5%. When the drawing rate is largely exceeds 300 m/min, such a construction is especially suitable since large scaling of the apparatus can be avoided and a prompt response can be obtained.

As described above, the absolute value of the outer diameter of the optical fiber which has been shrunk is measured within a preselected shrinkage range 0.5%, whereby the optical fiber with better accuracy in its size is produced. However, it is noticed that the diameter of the optical fiber is still not robustly controlled.

However, furthermore, from equation (1), it is noticed that the faster the drawing speed V(F) is, the higher the temperature of the optical fiber at a fixed position Z is. It is also noticed that when the drawing speed increases, i.e., from 100 m/min to 300 m/min, the position for the outer diameter measuring device is changed in this method.

Thus, necessary adjustment is needed to find the position at which the measuring device is disposed within the preselected shrinkage range 0.5%.

U.S. Pat. No. 5,443,610/1995 recognizes that the first measurement of the fiber diameter made on bare fiber in the region of the preform root, i.e., below the furnace, using an interference technique is not sufficient for a good control for the fiber diameter in view of error due to the fluctuation in the root with tractor speed. Different from U.S. Pat. No. 5,073,179 moving the diameter measuring device further from the furnace as the speed increased, U.S. Pat. No. 5,443,610 suggests to combine this first measured signal together with a second diameter measurement of a coated fiber after coating device into an overall control signal for drawing speed control in order to reduce the effect of such error on the overall control signal. However, it is still lack of a high accuracy measurement of the finished bare fiber diameter in both U.S. Pat. Nos. 5,333,610 and 5,073,179.

It is noticed that when the external diameter of the optical fiber varies due the presence of contaminants, such as microscopic particulate matter, the variation in external diameter is detected by the external diameter measuring device.

However, if bubbles or the like remain in the optical fiber preform over some length as it is drawn, the pulling rate of the pulling capstan 13 is suitably altered to maintain a consistent external diameter of the optical fiber 5. Accordingly, the external diameter measuring instrument 20 cannot detect irregular portions of the optical fiber 5. However, the bubbles may collapse when the optical fiber is drawn, even though the external diameter is controlled. Consequently, the core of the optical fiber deforms and causes increased transmission loss. U.S. Pat. No. 5,449,393/1995 uses a feedback control based on detecting irregular ratio of pulling rate to a predetermined time period.

To reduce a lag, the measurement device 20 is located immediately below the furnace; while to reduce the inaccuracy of outer diameter due to a shrinkage, the measurement device 30 is located within a shrinkage range of 0.5% with an estimate or experiments in U.S. Pat. No. 5,073,179.

In response to a hot market demand, the fiber drawing process becomes a high speed process to make high productivity. The preform becomes larger and larger and the drawing speed of the optical fiber in the drawing process becomes faster and faster. When preform becomes larger and larger, a unit deviation of the diameter of a preform from the preselected diameter will bring a larger area deviation and further a larger mass deviation of the preform from the preselected form.

Due to many physical and chemical factors, and environment changes, the preforms have fluctuations in their outer diameters within one preform and among different preforms. Thus, the diameters of various performs and the diameters of one perform at different locations are not uniform.

It is known that two major origins of fiber diameter fluctuation are temperature fluctuation of the furnace and the preform outer diameter fluctuation. The former origin usually causes short term fluctuation and the latter usually causes long term fluctuation of the fiber diameter fluctuation. Thus, it is important to know the preform diameter for the capstan drawing speed control and the preform feeding mechanism control in the drawing process control system in order to get a perfect diameter for the bare fiber. However, there are no preform diameter measurement step and its device during the conventional optical fiber drawing processes currently.

In order to compromise the reduction of the time lag and the accurate measurement of the fiber outer diameter, conventional methods set the outer diameter measurement of the bare fiber either near the furnace, or within the 0.5% shrinkage range, or at an adjustable position keeping the shrinkage range but as near the furnace as possible for the different drawing speeds.

It is still critical to find a novel method to solve both the measurement lag problem and the shrinkage problem. In other words, conventional methods must be at the sacrifice of either accurate measurement or prompt reaction due to only one outer diameter monitor 20 or 30 for the bare fiber 5.

Furthermore, it should be noticed that no convention method intends to monitor a finished bare fiber diameter which is really an important specification, e.g., 125 μm, before the coating step. However, in order to control exact outer diameter of the bare fiber with the highest accuracy, it is not only important but also necessary from the viewpoint of control system to measure the final outer diameter of the bare fiber on-line for generating feedback signals to the whole control system.

As the requirements for accuracy in optical fiber diameter increase and the minimization of fluctuation in that diameter become critical as the result of the connection between fibers becoming better, development of a process which improves the accuracy of the outer diameter of the optical fiber is highly desired. In view of the material fluctuation, perturbations of preforms, disturbances in the furnace, and environment changes, the optical fiber needs a robust optical fiber drawing process control to produce robust diameter-controlled optical fiber.

In all, current conventional fiber drawing processes are lack of robust control for the fiber diameter.

BRIEF SUMMARY OF THE INVENTION

It is an objective of this present invention to provide a highly robust diameter-controlled optical fiber.

Further, it is an object of the present invention to provide a drawing process for producing an optical fiber in which a high accuracy of an absolute value of an optical fiber diameter is ensured. Especially, a deviation of a measured outer diameter with a diameter measuring device from a true diameter of a finished optical fiber can be minimized, which is much smaller than that as obtained in the conventional processes.

It is found that an outer diameter measurement at a safe position just immediately above the coating device provides not only an exact on-line measurement for the outer diameter of the finished bare fiber, but also an important feedback signal for drawing process control to adjust its capstan speed because the finished bare fiber diameter is a required control variable and an important required specification. The position for this measurement does not need any adjustment for different drawing speeds. Thus, it avoids shrinkage ratio calculation and experiments for searching a suitable position to locate this outer diameter monitor. Only consideration needed for the monitor position is that it is nearest to coating device and safe for the monitor. Finally, this measurement provides the highest accurate outer diameter measurement of the finished bare fiber among any possible measurements above the coating device. It minimizes the difference between the measurement and the exact/true outer diameter of the finished bare fiber.

In control viewpoint, it is necessary to measure the final outer diameter of the bare fiber in order to control exact outer diameter of the bare fiber, and then to use the deviation of this exact bare fiber diameter from the preset diameter for feedback control. It means that a measurement should locate at a position just before the coating step. However, no current conventional methods have mentioned this way for the outer diameter measurement of the bare fiber.

In order to solve the time lag problem and the highest accurate measurement requirement for optical fiber, the present invention keeps a conventional outer diameter measurement at a safe position just immediately below the furnace. The reason for this measurement is that this measurement has the smallest time lag among any possible measurements below the furnace in order to use this measurement signal for the fiber drawing process control in face of the temperature fluctuation, the humidity fluctuation and dust particles in the furnace.

The present invention has a new outer diameter measurement of the preform at a position before the melting step in the furnace, usually at a safe position just immediately above the furnace. As the preform becomes larger and larger, this measurement becomes much more important to robustly control optical fiber diameter accuracy, especially, in view of that the preform outer diameter fluctuation is one major origin of fiber diameter fluctuation.

This new preform outer diameter monitor provides useful information of the preform diameters not only regarding the fluctuation of preform outer diameter but also regarding the end shape of the preform for the fiber drawing speed control and the preform feed mechanism control during the optical fiber drawing process.

In the present invention, the measurement signals from the preform outer diameter, the bare fiber diameter just leaving the furnace and the finished bare fiber diameter just before coating are fed back to the optical fiber drawing process control system to robustly control the drawing speed of the capstan and the feed speed of the preform feed mechanism.

According to the present invention, there is provided a drawing process for producing an optical fiber which comprises drawing the optical fiber from an outer diameter monitored preform therefor under tension to form the optical fiber while heating and melting the preform, wherein the outer diameter of the optical fiber on which no coating has been provided is measured at two different process positions, one of which is at a safe position immediately below the furnace and another of which is at a safe position immediately above the coating device where the bare fiber is finished, and drawing conditions are robustly controlled based on the measurement data from all these measurement instruments.

In the present invention, one choice of control law can be, but not limited to, based on a deviation of a final measured diameter of the bare fiber coming into the coating step from the specified outer diameter, a deviation of a measured diameter of the bare fiber leaving from the furnace from a preselected outer diameter, and a deviation of a measured outer diameter of the preform coming into the furnace from a preselected outer diameter. It may also be based on the fluctuation data from the current measurements in the above-mentioned diameter measurement monitors and the ones as certain period measurement history data.

In one preferred embodiment of the present invention, a temperature of the optical fiber at the measuring position of the outer diameter of the bare fiber which is just above the coating device is much lower than the glass softening point of the material of the optical fiber.

In another preferred embodiment of the present invention, a drawing rate (or linear velocity) from the preform is varied depending on the deviations in order to control the outer diameter of the optical fiber.

Variations of the present invention can include a combination of any partial invention in the present invention and any current conventional optical fiber drawing method or any mixture of current conventional optical fiber drawing method.

When twice outer diameter measurements are selected between the drawing furnace and the coating device, the first measurement device can be located at a safe position immediately after the furnace, and the second measurement device can be located at a safe position immediate above the coating device. When one outer diameter measurement is selected between the furnace and coating device, the measurement device may be located at an adjustable position, either at a position immediately before the coating step, or at a position at which shrinkage of the outer diameter of the optical fiber, while stretched, is not larger than the bare fiber diameter accuracy requirement, or at a safe position immediately below the drawing furnace.

This present invention includes a control for optical fiber drawing process based on the all or partial above-mentioned measurement data and/or the all or partial conventional measurement data, e.g., from an outer diameter measurement device located at a position at which shrinkage of the outer diameter of the optical fiber, while stretched, is not larger than 0.5% preferably 0.5 to 0.3%, or from an outer diameter measurement device located immediately below the furnace, during the optical fiber drawing process. Thus, it is a kind of robust control in face of fluctuations of the preform outer diameters and fluctuation of the bare fiber outer diameters due to various factors including the furnace temperature fluctuation, The present invention provides a very high quality of optical fiber with robustly controlled diameter of the optical fiber with very high diameter accuracy.

This present invention can also improve the strength of the optical fiber in view of a robustly controlled diameter of the optical fiber and robustly smooth drawing process due to the contribution to the control system from the above-mentioned invented on-line outer diameter measurements of the bare fiber and the preform.

BRIEF DESCRIPTION OF THE SEVERAL VIEWS OF THE DRAWINGS

Listing of all figures:

1. A schematic of robust diameter-controlled optical fiber drawing process;
2. Another schematic of robust diameter-controlled optical fiber drawing process;
3. A schematic of robust diameter-controlled optical fiber drawing process with one bare fiber diameter monitor;
4. Another schematic of robust diameter-controlled optical fiber drawing process with one bare fiber diameter monitor considering shrinkage;
5. Another schematic of robust diameter-controlled optical fiber drawing process with one bare fiber diameter monitor considering shrinkage at an adjustable position;
6. A schematic of robust diameter-controlled optical fiber drawing process with only one bare fiber diameter monitor near the furnace;
7. A schematic of robust diameter-controlled optical fiber drawing process with two bare fiber diameter monitors;
8. Another schematic of robust diameter-controlled optical fiber drawing process with two bare fiber diameter monitors;
9. A schematic of diameter-measured optical fiber drawing process;
10. A schematic of optical fiber drawing process (Pre Art 1);
11. Another schematic of optical fiber drawing process (Pre Art 2).

FIG. 1 is a schematic diagram showing one preferred embodiment of the present invention, in which an outer diameter measurement device is located immediately above the furnace and provides the outer diameter data of the preform to the control system; an outer diameter measurement device is located immediately below the furnace and provides the outer diameter data of the bare fiber to the control system; and an outer diameter measurement device is located immediately above the coating device and provides the outer diameter data of the finished bare fiber to the control system.

FIG. 2 is a schematic diagram showing another embodiment of the present invention, in which an outer diameter measurement device is located immediately above the furnace and provides the outer diameter data of the preform to the control system; an outer diameter measurement device is located immediately below the furnace and provides the outer diameter data of the bare fiber to the control system; and an outer diameter measurement device is located within a shrinkage range of 0.5%~0.3% above the coating device and provides the outer diameter data of the bare fiber with estimated finished diameter error range within 0.5%~0.3% to the control system.

FIG. 3 is a schematic diagram showing a further embodiment of the present invention, in which an outer diameter measurement device is located immediately above the furnace and provides the outer diameter data of the preform to the control system; and only one bare fiber outer diameter measurement device is located immediately above the coating device and provides the outer diameter of the finished bare fiber just coming into coating step to the control system.

FIG. 4 is a schematic diagram showing a further embodiment of the present invention, in which an outer diameter measurement device is located immediately above the furnace and provides the outer diameter data of the preform to the control system; and only one fiber outer diameter measurement device is located at a position within a shrinkage range of 0.5%~0.3% between the furnace and the coating device and provides the outer diameter data of the bare fiber with estimated finished diameter error range within 0.5%~0.3% to the control system.

FIG. 5 is another schematic diagram showing a further embodiment of the present invention, in which an outer diameter measurement device is located immediately above the furnace and provides the outer diameter data of the preform to the control system; and one fiber outer diameter measurement device is located at a different position 31 or 32, in which, when the drawing rate is small, detection of the outer diameter is carried out with the measuring device 31 and when the rate is increased, the detection is carried out with the measuring device 32. Alternatively, only one measuring device is used which can move along the optical fiber depending on the drawing rate.

FIG. 6 is a schematic diagram showing another embodiment of the present invention, in which an outer diameter measurement device is located immediately above the furnace and provides the outer diameter data of the preform to the control system; and only one outer diameter measurement device is located immediately below the furnace and provides the outer diameter of bare fiber just out from the furnace to the control system.

FIG. 7 is a schematic diagram showing one embodiment of the present invention, which includes two on-line outer diameter measurement devices: one outer diameter measurement device is located immediately below the furnace and provides the outer diameter data of the bare fiber to the control system; and another outer diameter measurement device is located immediately above the coating device and provides the outer diameter data of the finished bare fiber to the control system.

FIG. 8 is a schematic diagram showing one embodiment of the present invention, which has two on-line outer diameter measurement devices between the furnace and the coating device: one outer diameter measurement device is located immediately below the furnace and provides the outer diameter data of the bare fiber to the control system; and another outer diameter measurement device is located at a position with a shrinkage range of 0.5%~0.3% and provides the outer diameter data of the bare fiber with estimated finished diameter error range within 0.5%~0.3% to the control system.

FIG. 9 is a schematic diagram showing a variation of an embodiment of the present invention, which includes only one on-line outer diameter measurement device which is located immediately above the coating device and provides the outer diameter data of the finished bare fiber to the control system.

FIG. 10 (Prior Art) is a schematic diagram illustrating an improved conventional optical fiber drawing process (ref. to U.S. Pat. No. 5,073,179).

FIG. 11 (Prior Art) is a schematic diagram illustrating a conventional optical fiber drawing process (ref. to James J. Refi, *Fiber optic Cable—A Light Guide*).

DETAILED DESCRIPTION OF THE INVENTION (PREFERRED EMBODIMENTS)

The requirement for a high quality fiber drawing process includes the followings:

A uniform fiber diameter as industry requires, e.g., usually 125 µm for the glass;

A uniform coating making a coated fiber diameter such as of 250 µm;

Concentricity of fiber glass and coating layers;

A constant tension to satisfy the mechanical strength and avoid microbending; and A high speed process to make high productivity.

The optical fiber diameter is very important to reducing the loss of light transmission. It is an important issue to get a high grade optical fiber with the specified optical fiber diameter and needed accuracy of its optical fiber diameter. Most fibers produced have a diameter of 125 µm with deviations of less than 1 µm required for cabling and splicing. Certainly, the smaller the deviations of the optical fiber diameter, i.e., the higher accuracy of the optical fiber diameter, the better the performance of optical fiber is. The optical fiber diameter is effected by many factors during the optical fiber drawing process. The main factors include the furnace temperature fluctuation, the preform diameter fluctuation, the drawing speed by the capstan, and the preform feeding speed. It is well know that in the stable fiber drawing process, the resulting size of the bare fiber relative to the size of the preform is determined by the drawing speed of the fiber relative to the feed rate of the preform as described in the following equation (2):

$$v_d = v_f (D^2/d^2) \quad (2)$$

where $v_d$ is the fiber drawing speed, $v_f$ is the preform feeding speed, D is the preform diameter and d is the fiber diameter. It is obvious from equation (2) that the preform diameter is one major factor for determining the fiber drawing speed.

Thus, it is important to have a preform diameter monitor to measure the preform diameter D for securing a high accuracy of the finished optical fiber diameter d during the optical fiber drawing process. It is a main part of this present invention for the robust diameter-controlled optical fiber.

Further, it is noticed that due to the above-mentioned requirement of a high speed drawing process for a high productivity, the preforms become larger and larger in both diameter and length. Suppose a fluctuation ΔD in a preform diameter. In order to maintain the exact same diameter d of the optical fiber, the fiber drawing speed should have an adjustment amount $\Delta v_d$ and the preform feeding speed should have an adjustment amount $\Delta v_f$ as follows:

$$\Delta v_d = [v_f(2D \cdot \Delta D + \Delta D^2) + \Delta v_f(D + \Delta D)^2]/d^2 \quad (3)$$

which is derived from equation (2). Thus, when the preform diameter becomes larger, a same deviation ΔD needs a larger adjustment $\Delta v_d$ of the fiber drawing speed or a larger adjustment $\Delta v_f$ of the preform feeding speed in order to maintain the exact required outer diameter d of the optical fiber. It proves an urgent requirement for a preform diameter monitor during the fiber drawing process in presence of fluctuation of the preform diameters when the preform diameters become larger.

The location in which the fiber is formed and is mainly changing its size is the furnace zone. Thus, the position to locate a preform diameter monitor should be as near to the furnace as possible. If there is anything to limit the position of the measuring device, it has been that the measuring device should not be directly subjected to a strong radiation light from an upper portion of the furnace to avoid being heated to a remarkably high temperature. This arrangement should reduce the lead-time of the preform diameter data comparing the diameter data at a position in the furnace where the glass is melting and drawing into the fiber. For a high accuracy control, it may save a memory size in the control system.

This preform diameter measurement signal is fed back to both capstan speed control system and preform feeding speed control system during the optical fiber drawing process.

As above mentioned in the summary part, in order robustly to control the finished optical fiber diameter with a very high accuracy, it is necessary to measure the final optical fiber diameter just before the coating step. The reasons are the followings:

1. First, it is the exact finished optical fiber diameter providing an exact bare optical fiber diameter record for the optical fiber products;
2. Second, it can avoid any conventional "ahead" diameter measurement estimation error for the exact diameter of the optical fiber;
3. Third, it can further avoid any measurement error subject to the any effects due to contaminants, bubbles or the like remain in the optical fiber preform over some length as it is drawn, shrinkage, and so on.

This exact finished bare fiber diameter measurement is another part of the present invention for robustly diameter controlled optical fiber.

Because the main diameter change zone for the preform root in forming the optical fiber is the heating zone of the furnace, therefore it is better to have an outer diameter measurement monitor immediately below the furnace in order to reduce signal lag for the control. Thus, if there is anything to limit the position of the measuring device, it has been that the measuring device should not be directly subjected to a strong radiation light from a below portion of the furnace to avoid being heated to a remarkably high temperature.

It is the best to consider all three measurement signals from the preform diameter measurement, the first bare fiber diameter measurement and the second finished bare fiber diameter measurement for generating a fiber drawing speed control signal and a preform feeding control signal.

It can also been seen that to combine the above mentioned first bare fiber diameter measurement and second finished bare diameter measurement signals alone into an overall control signal is better than the method to combine the first bare fiber diameter measurement and the second coated fiber diameter measurement into an overall control signal which described in U.S. Pat. No. 5,443,610 in order to robustly control the optical fiber glass diameter, i.e., the final bare fiber diameter.

The preferred embodiments of the present invention are described in the following figures with various combinations of the three above-mentioned measurement monitors to produce robust diameter-controlled optical fiber during optical fiber drawing process.

FIG. 1 shows one most preferred embodiment of the present invention, in which the numerical number 1 indicates the preform feeding mechanism; 2 does the preform for the optical fiber; 3 does a drawing furnace; 4 does a fiber cooling distance or a fiber cooling device; 5 does a bare fiber between the furnace and the coating device; 6 does a die for resin coating applicator; 7 does a coated fiber; 8 does a coating concentrity monitor; 9 does a curing device (a furnace or lamps) for the resin; 11 does a final coated fiber; 12 does a coating diameter monitor; 13 does fiber drawing capstans; 14 does proof test (e.g., strength test); 15 does a winding up device for the optical fiber; 10 does a preform diameter monitor; 20 does an outer diameter monitor for the bare fiber; and 40 does an outer diameter monitor for the finished bare fiber.

The preform 2 which is heated and melted in the furnace 3 is stretched under tension to form the optical fiber 11, which is drawn by capstans 13 and is taken up to spool 15 installed in the winding up device.

In FIG. 1, monitor 10 for the preform is located at a safe position immediately above the furnace 3 in order to reduce the time lead; monitor 20 for the bare fiber is located at a safe position immediately below the furnace 3 in order to reduce the time lag; and monitor 40 for the finished bare fiber is located at a safe position immediately above the coating device in order to provide very high accurate measurement of the outer diameter for the finished bare fiber.

Generally, the outer diameter of the preform is gradually reduced in the furnace corresponding to an axial change of the preform temperature (therefore, a viscosity change of the preform material). Further, a size of the shrinking portion of the preform depends on the drawing rate. As the drawing speed increases, the outer diameter of the bare fiber and the fiber temperature at the outlet of the furnace increase. Of course, to control the outer diameter of the finished optical fiber depends on a preform diameter, structural factors of the drawing furnace such as a heating zone length, a size of the furnace outlet, a flow rate and a kind of an inert gas, as well as a bare fiber diameter. Thus, during the fiber drawing process, monitor 10 measures the outer diameter of the preform which is coming into the furnace, monitor 20 measures the outer diameter of the bare fiber which is coming out from the furnace, and monitor 40 measures the outer diameter of the finished bare fiber which is coming into the coating device.

Then, all these measured data are combined into an overall robust control system to form a fiber drawing speed control signal for capstans 13 and a preform feeding speed signal for the preform feeding mechanism 1, respectively.

Thus, an optical fiber having a better accuracy of the outer diameter of the optical fiber is produced. This outer diameter of the optical fiber is robustly controlled.

It can be seen that the present invention is particularly effective in the drawing of the optical fiber at a very high drawing rate which is becoming faster and faster.

Another embodiment of the present invention is shown in FIG. 2, in which three outer diameter monitors above the coating device are monitor 10 for the preform diameter measurement at a position safely and immediately above the furnace 3, monitor 20 for the bare fiber diameter measurement at a position safely and immediately below the furnace 3, and monitor 30 for the second measurement of the bare fiber at a position at which the diameter shrinkage range less than 0.5%. This embodiment is suitable for improving some conventional methods which currently have an outer diameter monitor 30 at that position with a shrinkage less than 0.5% as said in U.S. Pat. No. 5,073,179. The robust control system obtains the feedback signals from these diameter monitors and controls the fiber drawing speed and the preform feeding speed for producing robustly diameter controlled optical fibers.

The third embodiment of the present invention is shown in FIG. 3, in which two outer diameter monitors above the coating device are monitor 10 for the preform diameter measurement at a position safely and immediately above the furnace 3, and monitor 40 for the outer diameter measurement of the finished bare fiber at a position safely and immediately above the coating device. They provide control system feedback signals to the fiber drawing process control system for producing high quality optical fibers.

The fourth embodiment of the present invention is shown in FIG. 4, in which two outer diameter monitors above the coating device are monitor 10 for the preform diameter measurement at a position safely and immediately above the furnace 3, and monitor 30 at a position with a shrinkage ratio less than 0.5%. The control system collects these measurement data and determines the fiber drawing speed and the preform feeding speed.

A further embodiment of the present invention shown in FIG. 5 is to let monitor 30 in FIG. 4 can be adjusted based on the drawing speed, high or low. In the embodiment as shown in FIG. 4, it takes time to detect the outer diameter of the fiber which is under increase in its diameter in the case of small drawing rate, whereby a time lag arises in the control. In the embodiment as shown in FIG. 5, when the drawing rate is small, detection of the outer diameter is carried out with the measuring device 31 and when the rate is increased, the detection is carried out with the measuring device 32. Alternatively, only one measuring device is used which can move along the optical fiber depending on the drawing rate. The rest part in FIG. 5 is the same as the corresponding rest part in FIG. 4, such as monitor 10.

The sixth embodiment of the present invention is shown in FIG. 6, in which two outer diameter monitors above the coating device are monitor 10 for the preform diameter measurement at a position safely and immediately above the furnace 3, and monitor 20 for the outer diameter measurement of the bare fiber at a position safely and immediately below the furnace 3. The control system collects these measurement data and determines the fiber drawing speed and the preform feeding speed.

Monitor 20 has the smallest time lag than monitor 30 (or 31 or 32), especially when the drawing speed is low. Monitor 30 provides a higher accuracy of the out diameter of the optical fiber than monitor 20 when the drawing speed is high. However, monitor 40 has the highest accuracy of outer diameter measurement for the finished bare fiber, i.e., the optical fiber glass diameter.

A further variation of embodiments of the present invention is shown in FIG. 7, in which two outer diameter monitors between the furnace 3 and the coating device 6, but no diameter monitor for the preform diameter measurement above the furnace 3. Here, one monitor is monitor 20 and another is monitor 40 at the same respective positions as above-mentioned. This method can solve the problem which described in U.S. Pat. No. 5,443,610 in a better way since the monitor 40 can provide a higher accurate measurement of the outer diameter of the finished bare fiber with a less lag time than monitor 12 can in the conventional methods.

FIG. 8 shows another variation of embodiments of the present invention. In FIG. 8 monitor 20 and monitor 30 or 31 or 32 have been selected. They are at the positions as above-mentioned respectively. This method can provide the control system a less time lag information of the outer diameter of bare fiber from monitor 20 in addition to the information provided from monitor 30 or 31 or 32. It is really a new method to combine two previous separated conventional methods in order to get a more accurate outer diameter for optical fibers than any one of these two conventional methods individually.

FIG. 9 shows a further variation of embodiments of this present invention. In FIG. 9 the process has only one diameter monitor 40 between the furnace 3 and the coating device 6. This method may be an alternative method with an advantage of accurate measurement of the outer diameter of the finished bare fiber and keeping a record of this specification for the product optical fiber. However, this method has a cost of time lag for the control system.

Finally, FIG. 10 and FIG. 11 show two conventional methods of optical fiber drawing process respectively.

FIG. 10 has only monitor 30 (or 31 or 32) for measuring outer diameter of bare fiber at a position at which the shrinkage of the outer diameter is not larger than 0.5% (U.S. Pat. No. 5,073,179).

FIG. 11 shows only monitor 20 for measuring outer diameter of bare fiber at a conventional position immediately below the furnace 3. In this location monitor 20 minimizes the time lag with a cost without an accurate measurement of the outer diameter for the final bare fiber.

Finally, it should be pointed out that for the above-mentioned embodiments of the present invention shown in FIGS. 1–9, a forced cooling device for the optical fiber may be provided between furnace 3 (or monitor 20 when it is selected in the embodiment) and coating device 6 (or outer diameter measuring device 40 or 30 when it is selected in the embodiment), whereby the cooling distance between them can be shortened and the time lag can be shortened as well. Such a construction is especially preferred since large scaling of the apparatus can be avoided and a prompt response can be obtained.

As described above, according to the present invention, the absolute value of the outer diameter of the optical fiber can be not only measured correctly but also robustly controlled, whereby the optical fiber with better accuracy in its size is produced in face of fluctuations of the preform diameters, fluctuations of the furnace conditions, various disturbances and parameter perturbations, especially in a high productivity situation with increasing drawing speed, enlarging preform size and raising high performance of optical fiber during the optical fiber drawing process. Thus, this present invention provides robust diameter-controlled optical fibers during optical fiber drawing process.

What I claim as my invention is:

1. A drawing process for producing an optical fiber comprising the steps of:
    measuring either the outer diameter or shape of a preform;
    feeding said preform at a feeding speed into a furnace to heat and melt said preform;
    heating and melting said preform;
    while heating and melting, drawing said optical fiber from said preform at a drawing speed to form said optical fiber;
    measuring the outer diameter of said optical fiber at a position below the furnace;
    providing a control system with the measured outer diameter or shape of said preform, the measured outer diameter of said optical fiber, a predetermined preform value and a predetermined fiber value for controlling said drawing process;
    calculating a preform deviation of the measured preform diameter or shape from the predetermined preform value, and a fiber diameter deviation of the measured fiber diameter from the predetermined fiber value;
    generating control signals based on the combination of the preform deviation, the fiber diameter deviation, the measured preform diameter or shape, and the predetermined preform value for said optical fiber drawing process control; and
    adjusting the feeding speed of said preform and the drawing speed of said fiber according to said control signals;
    whereby said optical fiber drawing process is robustly controlled against deviations of the preform outer diameter or shape at different locations and against deviations of various preforms.

2. The process as claimed in claim 1, wherein the control signals are further based on the fiber measurement, and the predetermined fiber value.

3. The process as claimed in claim 2,
    wherein the position of measuring the optical fiber is at a position at which shrinkage of the outer diameter of said optical fiber is not larger than a predetermined allowable diameter deviation value of said optical fiber.

4. A drawing process for producing an optical fiber comprising the steps of:
    feeding a preform at a preform feeding speed into a furnace;
    heating and melting the preform in the furnace;
    while heating and melting, drawing said optical fiber from said preform at a fiber drawing speed;
    measuring the outer diameters of said optical fiber, which is bare, at two or more different measurement locations by respective measurement devices before coating,
    wherein a first location is close to the furnace to provide a first measured bare fiber diameter, and
    a second location is below the first location, at this second location shrinkage of the outer diameter of said optical fiber, while stretched under the drawing, is not larger than a predetermined allowable bare fiber diameter deviation value of said optical fiber, or the second location is immediately before coating to provide a second measured bare fiber diameter;
    coating said optical fiber;
    providing a control system with the measurement data from said measurement devices respectively at the different locations;
    calculating a first bare fiber diameter deviation of the first measured bare fiber diameter from a first preselected bare fiber diameter value;
    calculating a second bare fiber diameter deviation of the second measured bare fiber diameter from a second preselected bare fiber diameter value which is less than the first preselected bare fiber diameter value;
    generating control signals based on the combination of the first bare fiber diameter deviation and the second bare fiber diameter deviation for said optical fiber drawing process control; and
    adjusting the feeding speed of said preform and the drawing speed of said fiber according to said control signals.

5. A control method for an optical fiber drawing process control including the steps of:
    measuring a preform outer diameter by a measurement device before a heating and melting stage;
    feeding the measured preform at a feeding speed into a furnace in the heating and melting stage;
    while heating and melting said preform, drawing said optical fiber from said preform at a drawing speed to change the geometrical size of said preform to form said optical fiber which is a bare optical fiber before coating;

measuring said bare optical fiber by a first outer diameter measurement device located after said furnace to provide a first bare fiber diameter measurement;

measuring said bare optical fiber by a second outer diameter measurement device located after said first outer diameter measurement device and above a coating device to provide a second bare fiber diameter measurement;

coating said bare optical fiber in said coating device;

providing the preform outer diameter measurement and the first and second bare fiber diameter measurements into a control system which controls said feeding speed of said preform into the furnace in the heating and melting stage and said drawing speed of said fiber;

calculating a preform diameter deviation of the measured preform diameter from a preselected preform diameter value, and a first bare fiber diameter deviation of the first measured bare fiber diameter from a first preselected bare fiber diameter value;

calculating a second bare fiber diameter deviation of the second measured bare fiber diameter from a second preselected bare fiber diameter value which is less than the first preselected bare fiber diameter value;

generating control signals based on the preform diameter deviation, the first bare fiber diameter deviation and the second bare fiber diameter deviation for said optical fiber drawing process control; and adjusting the feeding speed of said preform and the drawing speed of said fiber according to said control signals.

6. The control method in claim 5, wherein said control signals are further based on the measured preform diameter and the preselected preform diameter.

7. The control method in claim 6, wherein the preform measurement device is located immediately above the furnace;

the first outer diameter measurement device of said bare fiber is located immediately after said furnace;

the second outer diameter measurement device of said bare fiber is located immediately above the coating device;

said control signals are further based on the first measured bare fiber diameter, the first preselected bare fiber diameter, the second measured bare fiber diameter and the second preselected bare fiber diameter.

* * * * *

UNITED STATES PATENT AND TRADEMARK OFFICE
CERTIFICATE OF CORRECTION

PATENT NO. : 7,197,898 B2
APPLICATION NO. : 09/989799
DATED : April 3, 2007
INVENTOR(S) : Sheng-Guo Wang It is certified that error appears in the above-identified patent and that said Letters Patent is hereby corrected as shown below:

1. Column 1, after line 22 and before line 23, should insert the following paragraphs:

BACKGROUND OF THE INVENTION
1. Field of the Invention
The present invention relates to optical fibers and a process for optical fiber drawing.
2. Description of the Related Art
Optical fiber drawing process is an important period of optical fiber manufacturing.

A conventional drawing process of optical fiber is as follows. A completed preform is fed slowly into a furnace where the preform end is heated to about 2000°C and soften. The soften glass forms a globule falling down from the furnace, through the other stages of the drawing process and onto a take-up spool. The stages thereof are outer diameter measurement, fiber cooling stage, fiber coating stage, coating concentrity measurement, curing stage, coating diameter measurement, fiber drawing capstans, proof test and winding on take-up spool. The feeding speed depends on the furnace design, preform diameter and draw speed. The optical fiber which has just left the furnace and is remaining intact is called "bare fiber". Usually, the required fiber diameter is controlled by varying the fiber draw speed while keeping furnace temperature and preform feeding speed constant. This is accomplished by monitoring the fiber diameter immediately as it comes out of the furnace by using one of several types of non-contacting methods, such as laser light scattering (James J. Refi, Fiber optic Cable – A Light Guide). Then, the controller uses this output signal of diameter measurement to automatically adjust the speed of the drawing capstans to obtain the correct output diameter.

The fiber cools down after leaving the diameter monitor. There may be a cooling device or just a natural cooling stage. Then, it has a protective plastic coating applied in order to preserve strength, to isolate itself from external force and to avoid microbending losses. There are two coating stages: one inner soft primary coating and another outer hard secondary coating. After coating applicator, a monitor measures concentricity which is another important specification. Then, the fiber passes a curing furnace/lamp. After coating and curing stages, a second diameter monitor is used to measure coated fiber diameter, i.e., to provide coating diameter measurement.

UNITED STATES PATENT AND TRADEMARK OFFICE
CERTIFICATE OF CORRECTION

PATENT NO. : 7,197,898 B2
APPLICATION NO. : 09/989799
DATED : April 3, 2007
INVENTOR(S) : Sheng-Guo Wang It is certified that error appears in the above-identified patent and that said Letters Patent is hereby corrected as shown below:

2. Column 3, line 54, "U.S. Pat. Nos. 5,333,610" should read --U.S. Pat. Nos. 5,443,610--.

Signed and Sealed this

Twenty-ninth Day of May, 2007

JON W. DUDAS
*Director of the United States Patent and Trademark Office*

UNITED STATES PATENT AND TRADEMARK OFFICE
CERTIFICATE OF CORRECTION

PATENT NO.         : 7,197,898 B2
APPLICATION NO. : 09/989799
DATED              : April 3, 2007
INVENTOR(S)        : Wang Page 1 of 10

It is certified that error appears in the above-identified patent and that said Letters Patent is hereby corrected as shown below:

PLEASE DELETE THE TITLE PAGE AND INSERT THE TITLE PAGE SHOWN ON THE ATTACHMENT

PLEASE DELETE SPECIFICATION COLUMNS 1 - 16 AND INSERT THE NEW SPECIFICATIONS COLUMNS 1 - 16 AS SHOWN ON THE ATTACHED PAGES.

Signed and Sealed this

Eighteenth Day of September, 2007

JON W. DUDAS
*Director of the United States Patent and Trademark Office*

(12) United States Patent
Wang

(10) Patent No.: US 7,197,898 B2
(45) Date of Patent: Apr. 3, 2007

(54) ROBUST DIAMETER-CONTROLLED OPTICAL FIBER DURING OPTICAL FIBER DRAWING PROCESS

(76) Inventor: Sheng-Guo Wang, 2516 Radrick La., Charlotte, NC (US) 28262

(*) Notice: Subject to any disclaimer, the term of this patent is extended or adjusted under 35 U.S.C. 154(b) by 213 days.

(21) Appl. No.: 09/989,799

(22) Filed: Nov. 20, 2001

(65) Prior Publication Data
US 2002/0066292 A1 Jun. 6, 2002

Related U.S. Application Data

(60) Provisional application No. 60/250,962, filed on Dec. 4, 2000.

(51) Int. Cl.
*C03B 37/00* (2006.01)
(52) U.S. Cl. ............................ 65/382; 65/377
(58) Field of Classification Search .............. 65/382, 65/377, 484, 491
See application file for complete search history.

(56) References Cited

U.S. PATENT DOCUMENTS

| | | | | |
|---|---|---|---|---|
| 4,793,840 A | * | 12/1988 | Harding | 65/381 |
| 5,073,179 A | * | 12/1991 | Yoshimura et al. | 65/382 |
| 5,551,967 A | * | 9/1996 | Urruti | 65/378 |
| 6,178,778 B1 | * | 1/2001 | Kenmochi et al. | 65/381 |
| 6,220,057 B1 | * | 4/2001 | Yamamura et al. | 65/382 |
| 6,371,394 B1 | * | 4/2002 | Roba | 242/178 |
| 6,438,997 B1 | * | 8/2002 | Saito et al. | 65/382 |
| 6,516,636 B1 | * | 2/2003 | Gansicke et al. | 65/379 |

FOREIGN PATENT DOCUMENTS

| | | | |
|---|---|---|---|
| GB | 2238536 | * | 11/1989 |
| JP | 52-120841 | * | 10/1977 |
| JP | 06-206734 | * | 7/1994 |

* cited by examiner

*Primary Examiner*—Dionne W. Mayes

(57) ABSTRACT

There is provided robust diameter-controlled optical fiber during optical fiber drawing process and an optical fiber drawing process which comprises drawing the optical fiber from a preform therefor under tension to form the optical fiber while heating and melting the preform, wherein an outer diameter of the preform is measured (at a safe position immediately) above the furnace, an outer diameter of the optical fiber on which no coating has been provided is measured at one process position or two process positions before coating, and drawing conditions are robustly controlled based on the deviation of the measured optical fiber diameter data and the measured preform diameter data from a preselected outer diameter of the optical fiber and a preselected outer diameter of the preform.

7 Claims, 11 Drawing Sheets

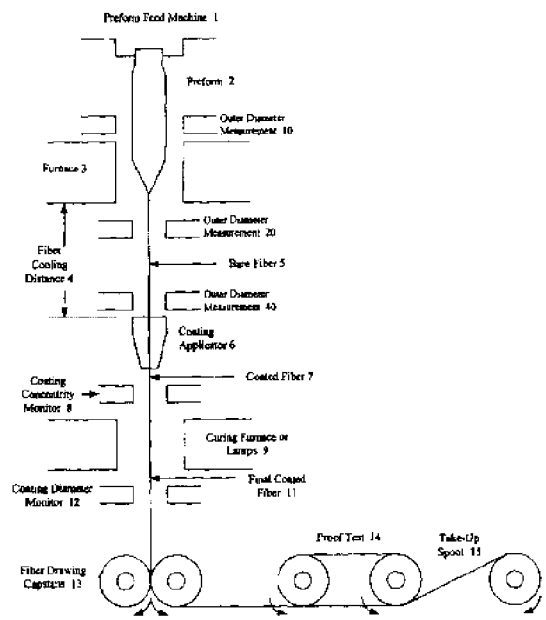

A schematic of robust diameter-controlled optical fiber drawing process

ROBUST DIAMETER-CONTROLLED OPTICAL FIBER DURING OPTICAL FIBER DRAWING PROCESS

This application is related to the provision Patent Application No. 60/250,962 with a filing date of Dec. 4, 2000.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to optical fibers and a process for optical fiber drawing.

2. Description of the Related Art

Optical fiber drawing process is an important period of optical fiber manufacturing.

A conventional drawing process of optical fiber is as follows. A completed preform is fed slowly into a furnace where the preform end is heated to about 2000° C. and soften. The soften glass forms a globule falling down from the furnace, through the other stages of the drawing process and onto a take-up spool. The stages thereof are outer diameter measurement, fiber cooling stage, fiber coating stage, coating concentricity measurement, curing stage, coating diameter measurement, fiber drawing capstans, proof test and winding on take-up stool. The feeding speed depends on the furnace design, preform diameter and draw speed. The optical fiber which has just left the furnace and is remaining intact is called "bare fiber". Usually, the required fiber diameter is controlled by varying the fiber draw speed while keeping furnace temperature and preform feeding speed constant. This is accomplished by monitoring the fiber diameter immediately as it comes out of the furnace by using one of several types of non-contacting methods, such as laser light scattering (James J. Refi, *Fiber optic Cable - A Light Guide*). Then, the controller uses this output signal of diameter measurement to automatically adjust the speed of the drawing capstans to obtain the correct output diameter.

The fiber cools down after leaving the diameter monitor. There may be a cooling device or just a natural cooling stage. Then, it has a protective plastic coating applied in order to preserve strength, to isolate itself from external force and to avoid microbending losses. There are two coating stages: one inner soft primary coating and another outer hard secondary coating. After coating applicator, a monitor measures concentricity which is another important specification. Then, the fiber passes a curing furnace/lamp. After coating and curing stages, a second diameter monitor is used to measure coated fiber diameter, i.e., to provide coating diameter measurement.

Next stage after coating and curing is to pull fiber on to a take-up spool. The fiber passes drawing capstans and wounded on to a take-up spool. There is a proof test, which may be an on-line test before the fiber is placed on the spool or an off-line test after the fiber is placed on the spool. The test may include a strength and tension test. In this fiber take-up stage, winding tension is kept low and the drum's surface is wrapped with a soft foam to cushion the fiber from the drum's surface in order to minimize the effect of added microbending losses. Refer to FIG. 11 to show this conventional drawing process (James J. Refi, *Fiber optic Cable—A Light Guide*).

It is known to employ a control method in which variations in the external diameter of the optical fiber are fed back to a pulling capstan. FIG. 11 (Prior Art) is a schematic diagram of a conventional drawing apparatus utilizing such a control method. An optical fiber preform 2 is melted in a heating furnace 3, pulled by a capstan 13, and formed into an optical fiber 5. The external diameter of the optical fiber 5 is measured by an external diameter measuring instrument 20 which is located just downstream of the heating furnace 3. Thereafter, the optical fiber 5 is coated with a resin by a coating unit 6, and then pulled through a resin curing furnace 9.

The external diameter measurements from the external diameter measuring instrument 20 are fed back to the control system of the pulling rate of the pulling capstan 13 so that the optical fiber has a consistent, predetermined external diameter (normally 125 μm).

A diameter of the bare fiber is measured by a measuring device 20 before the coating steps 6 and 9, whereby conditions during the drawing are controlled so that the outer diameter of the fiber 5 is to be a preselected one.

A position at which the diameter measuring device is disposed has not been thought to be critical, and the device is usually located immediately below the drawing furnace as shown in Japanese Patent Kokai Publication No. 295260/1986.

The main reason to locate the measuring device close to the furnace is to reduce the time lag and to increase a control gain when fluctuation in the diameter of the optical fiber has to be suppressed by controlling a drawing rate depending on an output signal from this measuring device.

If there is anything to limit the position of the measuring device, it has been that the measuring device should not be directly subjected to a strong radiation light from a lower portion of the furnace 3 to avoid being heated to a remarkably high temperature, i.e., located at a safe place.

Thus, as mentioned in U.S. Pat. No. 5,073,179/1991, in the conventional production of the optical fiber, usually a distance between the outer diameter measuring device 20 and the coating die 6 is longer than that between the drawing furnace 3 and the measuring device 20, or a forced cooling device is disposed between the measuring device 20 and the coating die 6 in order to achieve a better resin coating.

It has been noticed that the drawing rate of the optical fiber in drawing process is remarkably increased from a conventional drawing rate with the order of 100 m/min and it is reported that, in an experimental scale, a rate of 1000 m/min has been realized. When such a high drawing rate is employed in the conventional process in which the measuring device is located immediately below the furnace, it has been found that the outer diameter of the finished optical fiber is extremely smaller than the diameter which is measured with the measuring device 20. In order to meet an accuracy requirement in optical fiber diameter, U.S. Pat. No. 5,073,179/1991 proposes a modified fiber drawing process (see FIG. 10 Pre Art) wherein an outer diameter of the optical fiber 5 on which no coating has been provided is measured at position 30 at which shrinkage of the outer diameter of the optical fiber, while stretched, is not larger than 0.5% preferably 0.5 to 0.3% and drawing conditions are controlled with a deviation of a measured diameter at position 30 from a preselected outer diameter.

As used herein, the term "shrinkage" is intended to mean a ratio of difference in diameters between the optical fiber at the measuring position and the optical fiber once it has finished shrinking.

For example, the accuracy of the diameter of a quartz base optical fiber is usually required to be in 125 μm±1 μm. Taking account into an accuracy of the measuring device itself and the fluctuation in the diameter of the optical fiber during the production, a deviation of the measured diameter with the measuring device from a true diameter of the finished fiber should be not larger than 0.5% of the outer diameter of the finished fiber. Thus, a desirable process has been developed with a goal to reach the deviation of 0.5% or less in U.S. Pat. No. 5,073,179/1991.

The position at which the measuring device 30 is disposed is determined on the basis of the estimation of the fiber temperature according to the following equation (1) and experiments:

$$T(Z)=T(O)+(T(S)-T(O))e^{-aZ/V(F)} \quad (1)$$

where $T(O)$ is a room temperature (°C.), $T(S)$ is a temperature (°C.) of an optical fiber immediately after leaving a furnace, $Z$ (m) is a distance from an outlet of the furnace to a position at which an outer diameter of the optical fiber is measured, $V(F)$ is a drawing rate (or linear velocity) (m/min) and "a" is a constant determined with the diameter, a specific heat of the optical fiber and a thermal conductivity between the optical fiber and an atmosphere.

For the experiments, first, the difference between the measured outer diameter at position 30 in FIG. 10 and the true one is obtained with varying the position of the measuring device. Then, a relation between the difference and the measuring position 30 is established. Finally, the position 30 is determined at which the difference is less than 0.5%. Thus, the measuring device can be located at that position 30 and an optical fiber having a better accuracy is produced. It provides a better results comparing with early conventional method. However, it may not robustly maintain a high accuracy due to many disturbance factors, perturbations, and environment changes, as well as drawing speed level changes mentioned in the following paragraph.

It also takes time to detect the outer diameter of the fiber which is under increase in its diameter in the case of small drawing rate, whereby a time lag arises in the control. When the drawing rate is small, detection of the outer diameter is carried out with the measuring device at one location 31 nearer to the furnace and when the rate is increased, the detection is carried out with the measuring device at another location 32 below the former location. Alternatively, only one measuring device is used which can move along the optical fiber depending on the drawing rate. It was described in U.S. Pat. No. 5,073,179/1991.

Further, a forced cooling device for the optical fiber is provided between the furnace and the outer diameter measuring device, whereby the distance between them can be shortened. In this case, the diameter of the optical fiber is also measured at a position 30 at which the shrinkage of the outer diameter is not larger than 0.5%. When the drawing rate is largely exceeds 300 m/min, such a construction is especially suitable since large scaling of the apparatus can be avoided and a prompt response can be obtained.

As described above, the absolute value of the outer diameter of the optical fiber which has been shrunk is measured within a preselected shrinkage range 0.5%, whereby the optical fiber with better accuracy in its size is produced. However, it is noticed that the diameter of the optical fiber is still not robustly controlled.

However, furthermore, from equation (1), it is noticed that the faster the drawing speed $V(F)$ is, the higher the temperature of the optical fiber at a fixed position $Z$ is. It is also noticed that when the drawing speed increases, i.e., from 100 m/min to 300 m/min, the position for the outer diameter measuring device is changed in this method.

Thus, necessary adjustment is needed to find the position at which the measuring device is disposed within the preselected shrinkage range 0.5%.

U.S. Pat. No. 5,443,610/1995 recognizes that the first measurement of the fiber diameter made on bare fiber in the region of the preform root, i.e., below the furnace, using an interference technique is not sufficient for a good control for the fiber diameter in view of error due to the fluctuation in the root with tractor speed. Different from U.S. Pat. No. 5,073,179 moving the diameter measuring device further from the furnace as the speed increased, U.S. Pat. No. 5,443,610 suggests to combine this first measured signal together with a second diameter measurement of a coated fiber after coating device into an overall control signal for drawing speed control in order to reduce the effect of such error on the overall control signal. However, it is still lack of a high accuracy measurement of the finished bare fiber diameter in both U.S. Pat. Nos. 5,443,610 and 5,073,179.

It is noticed that when the external diameter of the optical fiber varies due the presence of contaminants, such as microscopic particulate matter, the variation in external diameter is detected by the external diameter measuring device.

However, if bubbles or the like remain in the optical fiber preform over some length as it is drawn, the pulling rate of the pulling capstan 13 is suitably altered to maintain a consistent external diameter of the optical fiber 5. Accordingly, the external diameter measuring instrument 20 cannot detect irregular portions of the optical fiber 5. However, the bubbles may collapse when the optical fiber is drawn, even though the external diameter is controlled. Consequently, the core of the optical fiber deforms and causes increased transmission loss. U.S. Pat. No. 5,449,393/1995 uses a feedback control based on detecting irregular ratio of pulling rate to a predetermined time period.

To reduce a lag, the measurement device 20 is located immediately below the furnace; while to reduce the inaccuracy of outer diameter due to a shrinkage, the measurement device 30 is located within a shrinkage range of 0.5% with an estimate or experiments in U.S. Pat. No. 5,073,179.

In response to a hot market demand, the fiber drawing process becomes a high speed process to make high productivity. The preform becomes larger and larger and the drawing speed of the optical fiber in the drawing process becomes faster and faster. When preform becomes larger and larger, a unit deviation of the diameter of a preform from the preselected diameter will bring a larger area deviation and further a larger mass deviation of the preform from the preselected form.

Due to many physical and chemical factors, and environment changes, the preforms have fluctuations in their outer diameters within one preform and among different preforms.

Thus, the diameters of various perforins and the diameters of one perform at different locations are not uniform.

It is known that two major origins of fiber diameter fluctuation are temperature fluctuation of the furnace and the preform outer diameter fluctuation. The former origin usually causes short term fluctuation and the latter usually causes long term fluctuation of the fiber diameter fluctuation. Thus, it is important to know the preform diameter for the capstan drawing speed control and the preform feeding mechanism control in the drawing process control system in order to get a perfect diameter for the bare fiber. However, there are no preform diameter measurement step and its device during the conventional optical fiber drawing processes currently.

In order to compromise the reduction of the time lag and the accurate measurement of the fiber outer diameter, conventional methods set the outer diameter measurement of the bare fiber either near the furnace, or within the 0.5% shrinkage range, or at an adjustable position keeping the shrinkage range but as near the furnace as possible for the different drawing speeds.

It is still critical to find a novel method to solve both the measurement lag problem and the shrinkage problem. In other words, conventional methods must be at the sacrifice of either accurate measurement or prompt reaction due to only one outer diameter monitor 20 or 30 for the bare fiber 5.

Furthermore, it should be noticed that no convention method intends to monitor a finished bare fiber diameter which is really an important specification, e.g., 125 µm, before the coating step. However, in order to control exact outer diameter of the bare fiber with the highest accuracy, it is not only important but also necessary from the viewpoint of control system to measure the final outer diameter of the bare fiber on-line for generating feedback signals to the whole control system.

As the requirements for accuracy in optical fiber diameter increase and the minimization of fluctuation in that diameter become critical as the result of the connection between fibers becoming better, development of a process which improves the accuracy of the outer diameter of the optical fiber is highly desired. In view of the material fluctuation, perturbations of preforms, disturbances in the furnace, and environment changes, the optical fiber needs a robust optical fiber drawing process control to produce robust diameter-controlled optical fiber.

In all, current conventional fiber drawing processes are lack of robust control for the fiber diameter.

BRIEF SUMMARY OF THE INVENTION

It is an objective of this present invention to provide a highly robust diameter-controlled optical fiber.

Further, it is an object of the present invention to provide a drawing process for producing an optical fiber in which a high accuracy of an absolute value of an optical fiber diameter is ensured. Especially, a deviation of a measured outer diameter with a diameter measuring device from a true diameter of a finished optical fiber can be minimized, which is much smaller than that as obtained in the conventional processes.

It is found that an outer diameter measurement at a safe position just immediately above the coating device provides not only an exact on-line measurement for the outer diameter of the finished bare fiber, but also an important feedback signal for drawing process control to adjust its capstan speed because the finished bare fiber diameter is a required control variable and an important required specification. The position for this measurement does not need any adjustment for different drawing speeds. Thus, it avoids shrinkage ratio calculation and experiments for searching a suitable position to locate this outer diameter monitor. Only consideration needed for the monitor position is that it is nearest to coating device and safe for the monitor. Finally, this measurement provides the highest accurate outer diameter measurement of the finished bare fiber among any possible measurements above the coating device. It minimizes the difference between the measurement and the exact/true outer diameter of the finished bare fiber.

In control viewpoint, it is necessary to measure the final outer diameter of the bare fiber in order to control exact outer diameter of the bare fiber, and then to use the deviation of this exact bare fiber diameter from the preset diameter for feedback control. It means that a measurement should locate at a position just before the coating step. However, no current conventional methods have mentioned this way for the outer diameter measurement of the bare fiber.

In order to solve the time lag problem and the highest accurate measurement requirement for optical fiber, the present invention keeps a conventional outer diameter measurement at a safe position just immediately below the furnace. The reason for this measurement is that this measurement has the smallest time lag among any possible measurements below the furnace in order to use this measurement signal for the fiber drawing process control in face of the temperature fluctuation, the humidity fluctuation and dust particles in the furnace.

The present invention has a new outer diameter measurement of the preform at a position before the melting step in the furnace, usually at a safe position just immediately above the furnace. As the preform becomes larger and larger, this measurement becomes much more important to robustly control optical fiber diameter accuracy, especially, in view of that the preform outer diameter fluctuation is one major origin of fiber diameter fluctuation.

This new preform outer diameter monitor provides useful information of the preform diameters not only regarding the fluctuation of preform outer diameter but also regarding the end shape of the preform for the fiber drawing speed control and the preform feed mechanism control during the optical fiber drawing process.

In the present invention, the measurement signals from the preform outer diameter, the bare fiber diameter just leaving the furnace and the finished bare fiber diameter just before coating are fed back to the optical fiber drawing process control system to robustly control the drawing speed of the capstan and the feed speed of the preform feed mechanism.

According to the present invention, there is provided a drawing process for producing an optical fiber which comprises drawing the optical fiber from an outer diameter monitored preform therefor under tension to form the optical fiber while heating and melting the preform, wherein the outer diameter of the optical fiber on which no coating has been provided is measured at two different process positions, one of which is at a safe position immediately below the furnace and another of which is at a safe position immediately above the coating device where the bare fiber is finished, and drawing conditions are robustly controlled based on the measurement data from all these measurement instruments.

In the present invention, one choice of control law can be, but not limited to, based on a deviation of a final measured diameter of the bare fiber coming into the coating step from the specified outer diameter, a deviation of a measured diameter of the bare fiber leaving from the furnace from a preselected outer diameter, and a deviation of a measured outer diameter of the preform coming into the furnace from a preselected outer diameter. It may also be based on the fluctuation data from the current measurements in the above-mentioned diameter measurement monitors and the ones as certain period measurement history data.

In one preferred embodiment of the present invention, a temperature of the optical fiber at the measuring position of the outer diameter of the bare fiber which is just above the coating device is much lower than the glass softening point of the material of the optical fiber.

In another preferred embodiment of the present invention, a drawing rate (or linear velocity) from the preform is varied depending on the deviations in order to control the outer diameter of the optical fiber.

Variations of the present invention can include a combination of any partial invention in the present invention and any current conventional optical fiber drawing method or any mixture of current conventional optical fiber drawing method.

When twice outer diameter measurements are selected between the drawing furnace and the coating device, the first measurement device can be located at a safe position immediately after the furnace, and the second measurement device can be located at a safe position immediate above the coating device. When one outer diameter measurement is selected between the furnace and coating device, the measurement device may be located at an adjustable position, either at a position immediately before the coating step, or at a position at which shrinkage of the outer diameter of the optical fiber, while stretched, is not larger than the bare fiber diameter accuracy requirement, or at a safe position immediately below the drawing furnace.

This present invention includes a control for optical fiber drawing process based on the all or partial above-mentioned measurement data and/or the all or partial conventional measurement data, e.g., from an outer diameter measurement device located at a position at which shrinkage of the outer diameter of the optical fiber, while stretched, is not larger than 0.5% preferably 0.5 to 0.3%, or from an outer diameter measurement device located immediately below the furnace, during the optical fiber drawing process. Thus, it is a kind of robust control in face of fluctuations of the preform outer diameters and fluctuation of the bare fiber outer diameters due to various factors including the furnace temperature fluctuation.

The present invention provides a very high quality of optical fiber with robustly controlled diameter of the optical fiber with very high diameter accuracy.

This present invention can also improve the strength of the optical fiber in view of a robustly controlled diameter of the optical fiber and robustly smooth drawing process due to the contribution to the control system from the above-mentioned invented on-line outer diameter measurements of the bare fiber and the preform.

BRIEF DESCRIPTION OF THE SEVERAL VIEWS OF THE DRAWINGS

Listing of all figures:

1. A schematic of robust diameter-controlled optical fiber drawing process;
2. Another schematic of robust diameter-controlled optical fiber drawing process;
3. A schematic of robust diameter-controlled optical fiber drawing process with one bare fiber diameter monitor;
4. Another schematic of robust diameter-controlled optical fiber drawing process with one bare fiber diameter monitor considering shrinkage;
5. Another schematic of robust diameter-controlled optical fiber drawing process with one bare fiber diameter monitor considering shrinkage at an adjustable position;
6. A schematic of robust diameter-controlled optical fiber drawing process with only one bare fiber diameter monitor near the furnace;
7. A schematic of robust diameter-controlled optical fiber drawing process with two bare fiber diameter monitors;
8. Another schematic of robust diameter-controlled optical fiber drawing process with two bare fiber diameter monitors;
9. A schematic of diameter-measured optical fiber drawing process;
10. A schematic of optical fiber drawing process (Pre Art 1);
11. Another schematic of optical fiber drawing process (Pre Art 2).

FIG. 1 is a schematic diagram showing one preferred embodiment of the present invention, in which an outer diameter measurement device is located immediately above the furnace and provides the outer diameter data of the preform to the control system; an outer diameter measurement device is located immediately below the furnace and provides the outer diameter data of the bare fiber to the control system; and an outer diameter measurement device is located immediately above the coating device and provides the outer diameter data of the finished bare fiber to the control system.

FIG. 2 is a schematic diagram showing another embodiment of the present invention, in which an outer diameter measurement device is located immediately above the furnace and provides the outer diameter data of the preform to the control system; an outer diameter measurement device is located immediately below the furnace and provides the outer diameter data of the bare fiber to the control system; and an outer diameter measurement device is located within a shrinkage range of 0.5%–0.3% above the coating device and provides the outer diameter data of the bare fiber with estimated finished diameter error range within 0.5%–0.3% to the control system.

FIG. 3 is a schematic diagram showing a further embodiment of the present invention, in which an outer diameter measurement device is located immediately above the furnace and provides the outer diameter data of the preform to the control system; and only one bare fiber outer diameter measurement device is located immediately above the coating device and provides the outer diameter of the finished bare fiber just coming into coating step to the control system.

FIG. 4 is a schematic diagram showing a further embodiment of the present invention, in which an outer diameter measurement device is located immediately above the furnace and provides the outer diameter data of the preform to the control system; and only one fiber outer diameter measurement device is located at a position within a shrinkage range of 0.5%–0.3% between the furnace and the coating device and provides the outer diameter data of the bare fiber with estimated finished diameter error range within 0.5%–0.3% to the control system.

FIG. 5 is another schematic diagram showing a further embodiment of the present invention, in which an outer diameter measurement device is located immediately above the furnace and provides the outer diameter data of the preform to the control system; and one fiber outer diameter measurement device is located at a different position 31 or 32, in which, when the drawing rate is small, detection of the outer diameter is carried out with the measuring device 31 and when the rate is increased, the detection is carried out with the measuring device 32. Alternatively, only one measuring device is used which can move along the optical fiber depending on the drawing rate.

FIG. 6 is a schematic diagram showing another embodiment of the present invention, in which an outer diameter measurement device is located immediately above the furnace and provides the outer diameter data of the preform to the control system; and only one outer diameter measurement device is located immediately below the furnace and provides the outer diameter of bare fiber just out from the furnace to the control system.

FIG. 7 is a schematic diagram showing one embodiment of the present invention, which includes two on-line outer diameter measurement devices: one outer diameter measurement device is located immediately below the furnace and provides the outer diameter data of the bare fiber to the control system; and another outer diameter measurement device is located immediately above the coating device and provides the outer diameter data of the finished bare fiber to the control system.

FIG. 8 is a schematic diagram showing one embodiment of the present invention, which has two on-line outer diameter measurement devices between the furnace and the coating device: one outer diameter measurement device is located immediately below the furnace and provides the outer diameter data of the bare fiber to the control system; and another outer diameter measurement device is located at a position with a shrinkage range of 0.5%–0.3% and provides the outer diameter data of the bare fiber with estimated finished diameter error range within 0.5%–0.3% to the control system.

FIG. 9 is a schematic diagram showing a variation of an embodiment of the present invention, which includes only one on-line outer diameter measurement device which is located immediately above the coating device and provides the outer diameter data of the finished bare fiber to the control system.

FIG. 10 (Prior Art) is a schematic diagram illustrating an improved conventional optical fiber drawing process (ref. to U.S. Pat. No. 5,073,179).

FIG. 11 (Prior Art) is a schematic diagram illustrating a conventional optical fiber drawing process (ref. to James J. Refi, *Fiber optic Cable—A Light Guide*).

DETAILED DESCRIPTION OF THE INVENTION (PREFERRED EMBODIMENTS)

The requirement for a high quality fiber drawing process includes the followings:

A uniform fiber diameter as industry requires, e.g., usually 125 μm for the glass;

A uniform coating making a coated fiber diameter such as of 250 μm;

Concentricity of fiber glass and coating layers;

A constant tension to satisfy the mechanical strength and avoid microbending; and A high speed process to make high productivity.

The optical fiber diameter is very important to reducing the loss of light transmission. It is an important issue to get high grade optical fiber with the specified optical fiber diameter and needed accuracy of its optical fiber diameter. Most fibers produced have a diameter of 125 μm with deviations of less than 1 μm required for cabling and splicing. Certainly, the smaller the deviations of the optical fiber diameter, i.e., the higher accuracy of the optical fiber diameter, the better the performance of optical fiber is. The optical fiber diameter is effected by many factors during the optical fiber drawing process. The main factors include the furnace temperature fluctuation, the preform diameter fluctuation, the drawing speed by the capstan, and the preform feeding speed. It is well know that in the stable fiber drawing process, the resulting size of the bare fiber relative to the size of the preform is determined by the drawing speed of the fiber relative to the feed rate of the preform as described in the following equation (2):

$$v_d = v_f (D^2/d^2) \qquad (2)$$

where $v_d$ is the fiber drawing speed, $v_f$ is the preform feeding speed, D is the preform diameter and d is the fiber diameter. It is obvious from equation (2) that the preform diameter is one major factor for determining the fiber drawing speed.

Thus, it is important to have a preform diameter monitor to measure the preform diameter D for securing a high accuracy of the finished optical fiber diameter d during the optical fiber drawing process. It is a main part of this present invention for the robust diameter-controlled optical fiber.

Further, it is noticed that due to the above-mentioned requirement of a high speed drawing process for a high productivity, the preforms become larger and larger in both diameter and length. Suppose a fluctuation $\Delta D$ in a preform diameter. In order to maintain the exact same diameter d of the optical fiber, the fiber drawing speed should have an adjustment amount $\Delta v_d$ and the preform feeding speed should have an adjustment amount $\Delta v_f$ as follows:

$$\Delta v_d = [v_f(2D \cdot \Delta D + \Delta D^2) + \Delta v_f(D + \Delta D)^2]/d^2 \qquad (3)$$

which is derived from equation (2). Thus, when the preform diameter becomes larger, a same deviation $\Delta D$ needs a larger adjustment $\Delta v_d$ of the fiber drawing speed or a larger adjustment $\Delta v_f$ of the preform feeding speed in order to maintain the exact required outer diameter d of the optical fiber. It proves an urgent requirement for a preform diameter monitor during the fiber drawing process in presence of fluctuation of the preform diameters when the preform diameters become larger.

The location in which the fiber is formed and is mainly changing its size is the furnace zone. Thus, the position to locate a preform diameter monitor should be as near to the furnace as possible. If there is anything to limit the position of the measuring device, it has been that the measuring device should not be directly subjected to a strong radiation light from an upper portion of the furnace to avoid being heated to a remarkably high temperature. This arrangement should reduce the lead-time of the preform diameter data comparing the diameter data at a position in the furnace where the glass is melting and drawing into the fiber. For a high accuracy control, it may save a memory size in the control system.

This preform diameter measurement signal is fed back to both capstan speed control system and preform feeding speed control system during the optical fiber drawing process.

As above mentioned in the summary part, in order robustly to control the finished optical fiber diameter with a very high accuracy, it is necessary to measure the final optical fiber diameter just before the coating step. The reasons are the followings:

1. First, it is the exact finished optical fiber diameter providing an exact bare optical fiber diameter record for the optical fiber products;
2. Second, it can avoid any conventional "ahead" diameter measurement estimation error for the exact diameter of the optical fiber;
3. Third, it can further avoid any measurement error subject to the any effects due to contaminants, bubbles or the like remain in the optical fiber preform over some length as it is drawn, shrinkage, and so on.

This exact finished bare fiber diameter measurement is another part of the present invention for robustly diameter controlled optical fiber.

Because the main diameter change zone for the preform root in forming the optical fiber is the heating zone of the furnace, therefore it is better to have an outer diameter measurement monitor immediately below the furnace in order to reduce signal lag for the control. Thus, if there is anything to limit the position of the measuring device, it has been that the measuring device should not be directly subjected to a strong radiation light from a below portion of the furnace to avoid being heated to a remarkably high temperature.

It is the best to consider all three measurement signals from the preform diameter measurement, the first bare fiber diameter measurement and the second finished bare fiber diameter measurement for generating a fiber drawing speed control signal and a preform feeding control signal.

It can also been seen that to combine the above mentioned first bare fiber diameter measurement and second finished bare diameter measurement signals alone into an overall control signal is better than the method to combine the first bare fiber diameter measurement and the second coated fiber diameter measurement into an overall control signal which described in U.S. Pat. No. 5,443,610 in order to robustly control the optical fiber glass diameter, i.e., the final bare fiber diameter.

The preferred embodiments of the present invention are described in the following figures with various combinations of the three above-mentioned measurement monitors to produce robust diameter-controlled optical fiber during optical fiber drawing process.

FIG. 1 shows one most preferred embodiment of the present invention, in which the numerical number 1 indicates the preform feeding mechanism; 2 does the preform for the optical fiber; 3 does a drawing furnace; 4 does a fiber cooling distance or a fiber cooling device; 5 does a bare fiber between the furnace and the coating device; 6 does a die for resin coating applicator; 7 does a coated fiber; 8 does a coating concentrity monitor; 9 does a curing device (a furnace or lamps) for the resin; 11 does a final coated fiber; 12 does a coating diameter monitor; 13 does fiber drawing capstans; 14 does proof test (e.g., strength test); 15 does a winding up device for the optical fiber; 10 does a preform diameter monitor; 20 does an outer diameter monitor for the bare fiber; and 40 does an outer diameter monitor for the finished bare fiber.

The preform 2 which is heated and melted in the furnace 3 is stretched under tension to form the optical fiber 11, which is drawn by capstans 13 and is taken up to spool 15 installed in the winding up device.

In FIG. 1, monitor 10 for the preform is located at a safe position immediately above the furnace 3 in order to reduce the time lead; monitor 20 for the bare fiber is located at a safe position immediately below the furnace 3 in order to reduce the time lag; and monitor 40 for the finished bare fiber is located at a safe position immediately above the coating device in order to provide very high accurate measurement of the outer diameter for the finished bare fiber.

Generally, the outer diameter of the preform is gradually reduced in the furnace corresponding to an axial change of the preform temperature (therefore, a viscosity change of the preform material). Further, a size of the shrinking portion of the preform depends on the drawing rate. As the drawing speed increases, the outer diameter of the bare fiber and the fiber temperature at the outlet of the furnace increase. Of course, to control the outer diameter of the finished optical fiber depends on a preform diameter, structural factors of the drawing furnace such as a heating zone length, a size of the furnace outlet, a flow rate and a kind of an inert gas, as well as a bare fiber diameter. Thus, during the fiber drawing process, monitor 10 measures the outer diameter of the preform which is coming into the furnace, monitor 20 measures the outer diameter of the bare fiber which is coming out from the furnace, and monitor 40 measures the outer diameter of the finished bare fiber which is coming into the coating device.

Then, all these measured data are combined into an overall robust control system to form a fiber drawing speed control signal for capstans 13 and a preform feeding speed signal for the preform feeding mechanism 1, respectively.

Thus, an optical fiber having a better accuracy of the outer diameter of the optical fiber is produced. This outer diameter of the optical fiber is robustly controlled.

It can be seen that the present invention is particularly effective in the drawing of the optical fiber at a very high drawing rate which is becoming faster and faster.

Another embodiment of the present invention is shown in FIG. 2, in which three outer diameter monitors above the coating device are monitor 10 for the preform diameter measurement at a position safely and immediately above the furnace 3, monitor 20 for the bare fiber diameter measurement at a position safely and immediately below the furnace 3, and monitor 30 for the second measurement of the bare fiber at a position at which the diameter shrinkage range less than 0.5%. This embodiment is suitable for improving some conventional methods which currently have an outer diameter monitor 30 at that position with a shrinkage less than 0.5% as said in U.S. Pat. No. 5,073,179. The robust control system obtains the feedback signals from these diameter monitors and controls the fiber drawing speed and the preform feeding speed for producing robustly diameter controlled optical fibers.

The third embodiment of the present invention is shown in FIG. 3, in which two outer diameter monitors above the coating device are monitor 10 for the preform diameter measurement at a position safely and immediately above the furnace 3, and monitor 40 for the outer diameter measurement of the finished bare fiber at a position safely and immediately above the coating device. They provide control system feedback signals to the fiber drawing process control system for producing high quality optical fibers.

The fourth embodiment of the present invention is shown in FIG. 4, in which two outer diameter monitors above the coating device are monitor 10 for the preform diameter measurement at a position safely and immediately above the furnace 3, and monitor 30 at a position with a shrinkage ratio less than 0.5%. The control system collects these measurement data and determines the fiber drawing speed and the preform feeding speed.

A further embodiment of the present invention shown in FIG. 5 is to let monitor 30 in FIG. 4 can be adjusted based on the drawing speed, high or low. In the embodiment as shown in FIG. 4, it takes time to detect the outer diameter of the fiber which is under increase in its diameter in the case of small drawing rate, whereby a time lag arises in the control. In the embodiment as shown in FIG. 5, when the drawing rate is small, detection of the outer diameter is carried out with the measuring device 31 and when the rate is increased, the detection is carried out with the measuring device 32. Alternatively, only one measuring device is used which can move along the optical fiber depending on the drawing rate. The rest part in FIG. 5 is the same as the corresponding rest part in FIG. 4, such as monitor 10.

The sixth embodiment of the present invention is shown in FIG. 6, in which two outer diameter monitors above the coating device are monitor 10 for the preform diameter measurement at a position safely and immediately above the furnace 3, and monitor 20 for the outer diameter measurement of the bare fiber at a position safely and immediately below the furnace 3. The control system collects these measurement data and determines the fiber drawing speed and the preform feeding speed.

Monitor 20 has the smallest time lag than monitor 30 (or 31 or 32), especially when the drawing speed is low. Monitor 30 provides a higher accuracy of the out diameter of the optical fiber than monitor 20 when the drawing speed is high. However, monitor 40 has the highest accuracy of outer diameter measurement for the finished bare fiber, i.e., the optical fiber glass diameter.

A further variation of embodiments of the present invention is shown in FIG. 7, in which two outer diameter monitors between the furnace 3 and the coating device 6, but no diameter monitor for the preform diameter measurement above the furnace 3. Here, one monitor is monitor 20 and another is monitor 40 at the same respective positions as above-mentioned. This method can solve the problem which described in U.S. Pat. No. 5,443,610 in a better way since the monitor 40 can provide a higher accurate measurement of the outer diameter of the finished bare fiber with a less lag time than monitor 12 can in the conventional methods.

FIG. 8 shows another variation of embodiments of the present invention. In FIG. 8 monitor 20 and monitor 30 or 31 or 32 have been selected. They are at the positions as above-mentioned respectively. This method can provide the control system a less time lag information of the outer diameter of bare fiber from monitor 20 in addition to the information provided from monitor 30 or 31 or 32. It is really a new method to combine two previous separated conventional methods in order to get a more accurate outer diameter for optical fibers than any one of these two conventional methods individually.

FIG. 9 shows a further variation of embodiments of this present invention. In FIG. 9 the process has only one diameter monitor 40 between the furnace 3 and the coating device 6. This method may be an alternative method with an advantage of accurate measurement of the outer diameter of the finished bare fiber and keeping a record of this specification for the product optical fiber. However, this method has a cost of time lag for the control system.

Finally, FIG. 10 and FIG. 11 show two conventional methods of optical fiber drawing process respectively.

FIG. 10 has only monitor 30 (or 31 or 32) for measuring outer diameter of bare fiber at a position at which the shrinkage of the outer diameter is not larger than 0.5% (U.S. Pat. No. 5,073,179).

FIG. 11 shows only monitor 20 for measuring outer diameter of bare fiber at a conventional position immediately below the furnace 3. In this location monitor 20 minimizes the time lag with a cost without an accurate measurement of the outer diameter for the final bare fiber.

Finally, it should be pointed out that for the above-mentioned embodiments of the present invention shown in FIGS. 1–9, a forced cooling device for the optical fiber may be provided between furnace 3 (or monitor 20 when it is selected in the embodiment) and coating device 6 (or outer diameter measuring device 40 or 30 when it is selected in the embodiment), whereby the cooling distance between them can be shortened and the time lag can be shortened as well. Such a construction is especially preferred since large scaling of the apparatus can be avoided and a prompt response can be obtained.

As described above, according to the present invention, the absolute value of the outer diameter of the optical fiber can be not only measured correctly but also robustly controlled, whereby the optical fiber with better accuracy in its size is produced in face of fluctuations of the preform diameters, fluctuations of the furnace conditions, various disturbances and parameter perturbations, especially in a high productivity situation with increasing drawing speed, enlarging preform size and raising high performance of optical fiber during the optical fiber drawing process. Thus, this present invention provides robust diameter-controlled optical fibers during optical fiber drawing process.

What I claim as my invention is:

1. A drawing process for producing an optical fiber comprising the steps of:
    measuring either the outer diameter or shape of a preform;
    feeding said preform at a feeding speed into a furnace to heat and melt said preform;
    heating and melting said preform;
    while heating and melting, drawing said optical fiber from said preform at a drawing speed to form said optical fiber;
    measuring the outer diameter of said optical fiber at a position below the furnace;
    providing a control system with the measured outer diameter or shape of said preform, the measured outer diameter of said optical fiber, a predetermined preform value and a predetermined fiber value for controlling said drawing process;
    calculating a preform deviation of the measured preform diameter or shape from the predetermined preform value, and a fiber diameter deviation of the measured fiber diameter from the predetermined fiber value;
    generating control signals based on the combination of the preform deviation, the fiber diameter deviation, the measured preform diameter or shape, and the predetermined preform value for said optical fiber drawing process control; and
    adjusting the feeding speed of said preform and the drawing speed of said fiber according to said control signals;
    whereby said optical fiber drawing process is robustly controlled against deviations of the preform outer diameter or shape at different locations and against deviations of various preforms.

2. The process as claimed in claim 1, wherein the control signals are further based on the fiber measurement, and the predetermined fiber value.

3. The process as claimed in claim 2,
    wherein the position of measuring the optical fiber is at a position at which shrinkage of the outer diameter of said optical fiber is not larger than a predetermined allowable diameter deviation value of said optical fiber.

4. A drawing process for producing an optical fiber comprising the steps of:

feeding a preform at a preform feeding speed into a furnace;

heating and melting the preform in the furnace;

while heating and melting, drawing said optical fiber from said preform at a fiber drawing speed;

measuring the outer diameters of said optical fiber, which is bare, at two or more different measurement locations by respective measurement devices before coating, wherein a first location is close to the furnace to provide a first measured bare fiber diameter, and a second location is below the first location, at this second location shrinkage of the outer diameter of said optical fiber, while stretched under the drawing, is not larger than a predetermined allowable bare fiber diameter deviation value of said optical fiber, or the second location is immediately before coating to provide a second measured bare fiber diameter;

coating said optical fiber;

providing a control system with the measurement data from said measurement devices respectively at the different locations;

calculating a first bare fiber diameter deviation of the first measured bare fiber diameter from a first preselected bare fiber diameter value;

calculating a second bare fiber diameter deviation of the second measured bare fiber diameter from a second preselected bare fiber diameter value which is less than the first preselected bare fiber diameter value;

generating control signals based on the combination of the first bare fiber diameter deviation and the second bare fiber diameter deviation for said optical fiber drawing process control; and adjusting the feeding speed of said preform and the drawing speed of said fiber according to said control signals.

5. A control method for an optical fiber drawing process control including the steps of:

measuring a preform outer diameter by a measurement device before a heating and melting stage;

feeding the measured preform at a feeding speed into a furnace in the heating and melting stage;

while heating and melting said preform, drawing said optical fiber from said preform at a drawing speed to change the geometrical size of said preform to form said optical fiber which is a bare optical fiber before coating;

measuring said bare optical fiber by a first outer diameter measurement device located after said furnace to provide a first bare fiber diameter measurement;

measuring said bare optical fiber by a second outer diameter measurement device located after said first outer diameter measurement device and above a coating device to provide a second bare fiber diameter measurement;

coating said bare optical fiber in said coating device;

providing the preform outer diameter measurement and the first and second bare fiber diameter measurements into a control system which controls said feeding speed of said preform into the furnace in the heating and melting stage and said drawing speed of said fiber;

calculating a preform diameter deviation of the measured preform diameter from a preselected preform diameter value, and a first bare fiber diameter deviation of the first measured bare fiber diameter from a first preselected bare fiber diameter value;

calculating a second bare fiber diameter deviation of the second measured bare fiber diameter from a second preselected bare fiber diameter value which is less than the first preselected bare fiber diameter value;

generating control signals based on the preform diameter deviation, the first bare fiber diameter deviation and the second bare fiber diameter deviation for said optical fiber drawing process control; and adjusting the feeding speed of said preform and the drawing speed of said fiber according to said control signals.

6. The control method in claim 5, wherein said control signals are further based on the measured preform diameter and the preselected preform diameter.

7. The control method in claim 6, wherein the preform measurement device is located immediately above the furnace;

the first outer diameter measurement device of said bare fiber is located immediately after said furnace;

the second outer diameter measurement device of said bare fiber is located immediately above the coating device;

said control signals are further based on the first measured bare fiber diameter, the first preselected bare fiber diameter, the second measured bare fiber diameter and the second preselected bare fiber diameter.

* * * * *